US012731387B2

(12) United States Patent
Walser et al.

(10) Patent No.: US 12,731,387 B2
(45) Date of Patent: Sep. 8, 2026

(54) CABLE PROCESSING STATION, CABLE MACHINE WITH CABLE PROCESSING STATIONS AND COMPUTER-IMPLEMENTED METHOD

(71) Applicant: SCHLEUNIGER AG, Thun (CH)

(72) Inventors: Markus Walser, Thun (CH); Christian Huggler, Steffisburg (CH)

(73) Assignee: SCHLEUNIGER AG, Thun (CH)

( * ) Notice: Subject to any disclaimer, the term of this patent is extended or adjusted under 35 U.S.C. 154(b) by 428 days.

(21) Appl. No.: 17/794,858

(22) PCT Filed: Jan. 21, 2021

(86) PCT No.: PCT/IB2021/050461
§ 371 (c)(1),
(2) Date: Jul. 22, 2022

(87) PCT Pub. No.: WO2021/148981
PCT Pub. Date: Jul. 29, 2021

(65) Prior Publication Data

US 2023/0056526 A1 Feb. 23, 2023

(30) Foreign Application Priority Data

Jan. 23, 2020 (EP) .................................... 20153475

(51) Int. Cl.
*G06V 10/75* (2022.01)
*G06T 7/00* (2017.01)
(Continued)

(52) U.S. Cl.
CPC ............ *G06V 10/82* (2022.01); *G06T 7/0004* (2013.01); *G06T 7/11* (2017.01); *G06V 10/75* (2022.01); *G06V 10/764* (2022.01)

(58) Field of Classification Search
CPC ...... G06V 10/82; G06V 10/75; G06V 10/764; G06V 2201/06; G06T 7/0004; G06T 7/11; G06F 18/22
See application file for complete search history.

(56) References Cited

U.S. PATENT DOCUMENTS

2002/0036770 A1 3/2002 Maeda
2015/0287180 A1 10/2015 Frey
(Continued)

FOREIGN PATENT DOCUMENTS

CN 105932509 A 9/2016
CN 107104342 A 8/2017
(Continued)

OTHER PUBLICATIONS

Jalil et al, Fault Detection in Power Equipment via an Unmanned Aerial System Using Multi-Modal Data, 2019, Sensors 19 (3014): 1-15. (Year: 2019).*

(Continued)

*Primary Examiner* — Kathleen M Broughton
(74) *Attorney, Agent, or Firm* — Secant IP, PLLC

(57) ABSTRACT

The invention relates to a cable processing station 20 for processing a cable end 12 of a cable 10, comprising at least a first tool 22 for processing the cable 10, a control device 40 for controlling the at least first tool 22 and a first imaging sensor device 25 for detecting at least one image of at least a cable end 12 of the cable 10, and an image processing system 30. The image processing system 30 is connected to the control device 40 for exchanging control-specific parameters and is configured to identify a first cable-specific image parameter and at least a second cable-specific image parameter from the at least one image detected and to create a control-specific parameter and to transmit same to the control device 40 in order to control the first tool 22. The invention also relates to a computer-implemented method
(Continued)

Figure 1:
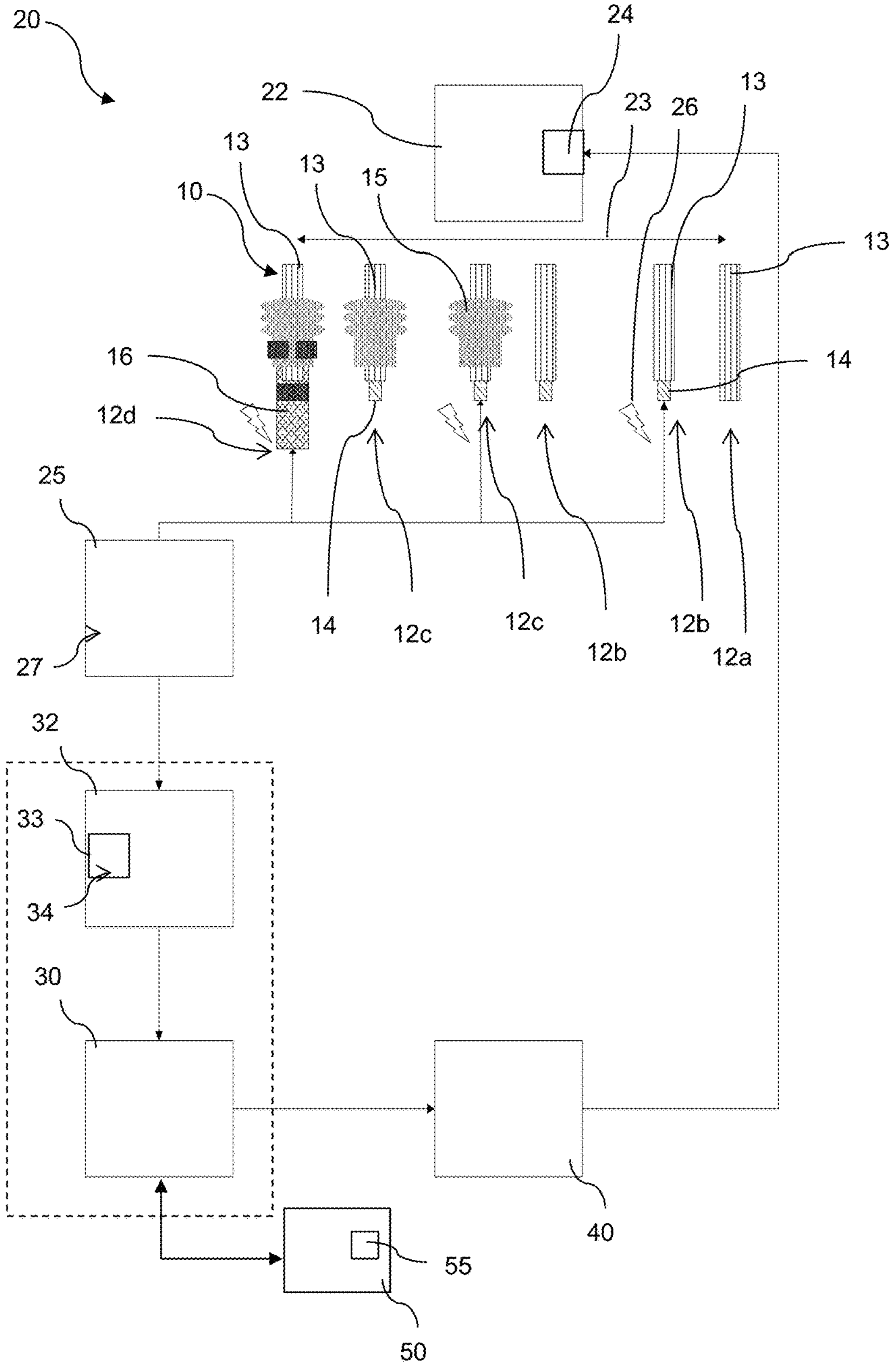

for automatically determining and generating control datasets and/or control-specific parameters for controlling at least one cable processing station and also to a cable processing machine having at least one cable processing station.

20 Claims, 7 Drawing Sheets

(51) Int. Cl.

| | |
|---|---|
| ***G06T 7/11*** | (2017.01) |
| ***G06V 10/764*** | (2022.01) |
| ***G06V 10/82*** | (2022.01) |

(56) References Cited

U.S. PATENT DOCUMENTS

| | | | | |
|---|---|---|---|---|
| 2016/0268786 | A1* | 9/2016 | Ayabakan | H02G 1/1248 |
| 2018/0215046 | A1* | 8/2018 | Oe | G06T 1/00 |
| 2022/0085583 | A1* | 3/2022 | Gundel | H02G 1/127 |

FOREIGN PATENT DOCUMENTS

| | | | | |
|---|---|---|---|---|
| DE | 102013207728 | A1 * | 10/2014 | A61B 1/00006 |
| DE | 102016122728 | A1 * | 5/2018 | |
| EP | 0 702 227 | A1 | 3/1996 | |
| EP | 3 146 600 | B1 | 6/2019 | |
| JP | 2014-079157 | A2 | 5/2014 | |
| JP | 2016-185060 | A2 | 10/2016 | |

OTHER PUBLICATIONS

Zhang et al, An automatic diagnostic method of abnormal heat defect in transmission lines based on infrared video, 2016, 4th International Conference on Applied Robotics for the Power Industry, pp. 1-5. (Year: 2016).*

Zhao et al, Representation of binary feature pooling for detection of insulator strings in infrared images, 2016, IEEE Transactions on Dielectrics and Electrical Insulation, 2858-2866. (Year: 2016).*

Chaou et al, Elaboration of novel image processing algorithm for arcing discharges recognition on HV polluted insulator model, 2015, IEEE Transactions on Dielectrics and Electrical Insulation, 22(2): 990-999. (Year: 2015).*

Iruansi et al, An active contour approach to insulator segmentation, 2015, AFRICON, pp. 1-6. (Year: 2015).*

Ghidoni et al, Automatic Color Inspection for Colored Wires in Electric Cables, 2014, IEEE Transactions on Automation Science and Engineering, 12(2): 596-607. (Year: 2014).*

Shan et al, Research of Measure System to Cable Insulation Parameters Based on Computer Vision, 2009, Int. Workshop on Eduction Technology and Computer Science, pp. 1-4. (Year: 2009).*

L. Chen et al., "Encoder-Decoder with Atrous Separable Convolution for Semantic Image Segmentation", Google, Inc., 2018, pp. 1-18, See Spc., p. 6.

S. Suzuki et al., "Topologial Structural Analysis of Digitized Binary Images by Border Following", Computer Vision, Graphics, and Image Processing, vol. 30, 1985, pp. 32-46, See Spc., p. 12 & 19.

A. Mayr et al., "Potentials of Machine Learning in Electric Drives Production Using the Example of Contacting Processes and Selective Magnet Assembly", 2017 7th International Electric Drives Production Conference (EDPC), IEEE, Dec. 5, 2017, pp. 1-8 See International Search.

International Search Report Corresponding to PCT/IB2021/050461 mailed Mar. 24, 2021.

Written Opinion Corresponding to PCT/IB2021/050461 mailed Mar. 24, 2021.

Japanese Office Action Corresponding to 2022-543738 mailed Mar. 11, 2025.

* cited by examiner

CABLE PROCESSING STATION, CABLE MACHINE WITH CABLE PROCESSING STATIONS AND COMPUTER-IMPLEMENTED METHOD

DESCRIPTION

The invention relates to a cable processing station, a cable machine with cable processing stations, and a computer-implemented method according to the independent claims. Optical cable inspection devices are known per se. They are used for performing quality control in cable processing, for spot checking finished cable systems consisting of a cable end and a terminal, such as a plug for electrically or optically connecting a cable with an end device, for example. US20020036770A1 describes such an inspection device, with which the fastening state of an electrical cable produced by a crimped portion of the connecting metal fitting can be evaluated. The inspection device of the connecting metal fitting includes an illumination lamp, a CCD camera for capturing an image, a dark box and a control unit. The control unit assesses the quality or otherwise of the crimping condition of at least a part of the crimped part on the basis of a dark region within an inspection area of the image. A similar method is known from EP 0 702 227 A1.

The drawback of these known solutions is that faults are detected so that the faulty parts can be rejected, the activity is not accompanied by a more fundamental change in the cable processing process.

EP 3 146 600 B1 describes a crimping apparatus with an image capturing device which monitors an operation for positioning a cable relative to a connecting element before a crimping process in such manner that the image capturing device detects the position of a cable end of the cable and transmits it to the control device of the crimping apparatus. The drawback of these known solutions is that an incorrect cable type not in the crimping apparatus is not detectable. Furthermore, the crimping tool must remain in an open state for a long period to allow the image to be captured so that an image of the connecting element can be detected. This results in a relatively long standstill time in the process. DE 10 2016 122 728 A1 describes a method for positioning strands guided by a measurement system, consisting of a cable processing apparatus with an image processing system for recording an image of a cable end and a feed apparatus for feeding the cable to the cable processing apparatus, wherein a position of the cable in a processing area of the cable processing apparatus can be determined on the basis of the recorded image of the cable end.

A disadvantage of this known solution is that only the positioning of the cable in the processing area of he cable processing apparatus is possible with the feed device. A further drawback is that no material regions are detected on the cable.

Thus, the task of the present invention is to create a cable processing station which avoids at least one of the above-mentioned drawbacks, and in particular enables rapid tracking of the cable processing process after deviations from an ideal cable processing process have been discovered. Additionally, a cable processing machine with high cable processing reliability is to be created. Besides this, it is intended to create a computer-implemented method for controlling at least one cable processing station, which corrects production faults in the cable processing station and thus improves the cable processing process.

The task is solved with the features of the independent claims. Advantageous further developments are presented in the figures and the dependent claims.

A cable processing station according to the invention for processing a cable end of a cable, in particular an electrical or optical cable, comprising at least one first tool for processing the cable and one control device for controlling the at least first tool. The cable processing station according to the invention further comprises at least a first imaging sensor device for detecting at least one image of at least one cable end of the cable, and an image processing system. The image processing system is connected to the control device for exchanging control-specific parameters, and is configured to identify a first cable-specific image parameter and at least a second cable-specific a image parameter from the at least one detected image, and to create at least one control-specific parameter on the basis of the first cable-specific image parameter and the second cable-specific image parameter and transmit this to the control device for controlling the first tool.

Otherwise expressed, the at least one control-specific parameter is created on the basis of a combination of the at least one first cable-specific image parameter and the second cable-specific image parameter. The first tool can be controlled and/regulated automatically on the basis of the at least one control-specific parameter, thus making it possible to quickly track the cable processing process in the cable processing station. A control-specific parameter is suitable for generating a control dataset in the controller with at least one control command at least for the first tool of the cable processing station.

For example, the electrical conductor, also typically referred to as the cable core, is identified as the first cable-specific image parameter in the detected image, and for example the cable isolation, also typically referred to as the jacket, is identified as the second cable-specific image parameter in the detected image. Subsequently, the combination of identifying the at least one first cable-specific image parameter and the second cable-specific image parameter leads in the image processing system to a specific cable type, which is processable with the cable processing station or is intended for processing in the cable processing station. The control datasets that are relevant for this cable type can be retrieved automatically by the controller in order to process the cable end with the first tool. For example, a cable processing station is an insulation stripping station for stripping the cable end, or a crimping press for crimping a terminal on the electrical conductor, or the like, wherein the first tool is a cable feed device or a stripping knife or a crimping tool. The cable processing station may further comprise a sealing element fitting device, with which a seal can be fitted on the cable end or electrical conductor. In this context, a means for fitting the seal on the cable, typically such as a gripper mechanism or a pneumatic fitting device, may be implemented as the first tool. The tools may typically each be driven by a drive in such manner that they are able to perform the intended process work steps. The respective drives for the tools are electrically connected to the controller for the purpose of exchanging control-specific parameters.

A fixed position camera or a line sensor which can be moved relatively over the cable in a typical raster scanning procedure may serve as the first imaging sensor device. A fixed position camera may be positioned on the cable processing station, occupying little space. A movable line sensor may detect a larger cable end on the cable. Alternatively, the camera may be mounted on a movement device at the cable processing station, in such manner that it can be moved, by swivelling for example, from the first tool of the cable processing station to another tool of the cable processing station. The camera may in particular detect multiple images of the cable end of the cable in order to provide a larger selection of detected images to the image processing system. In this context, the camera may record images of the cable or the cable end from various perspectives, and in particular at least one image for a frontal view of the cable axis in order to record the layer construction of the cable. In this way, for example, a twining (twist) of the electrical conductor is rendered identifiable on the detected image. The camera represented here typically has a zoomable lens and various standard commercial filter elements, and is configured to detect three-dimensional images.

Additionally, a further imaging sensor device may be arranged on the cable processing station, so that the at least one detected image may consist of multiple partial images and/or may be detectable from multiple camera angles relative to the cable end of the cable, in order to improve the image quality or photograph quality of the detected images.

An AI module is preferably present, and is connected to the at least one first imaging sensor device and configured to capture the first cable-specific image parameter and at least the second cable-specific image parameter from the at least one detected image. An AI (Artificial Intelligence) module is teachable for example with external or separate image data or parameters (material, structure, colour, shape, etc.) for the respective cable type. For this purpose, the AI module may contain an arithmetic unit to enable it to be taught easily. Consequently, this AI module is usable in a broad application spectrum, wherein the accuracy is improved in, the application, particularly when analysing many different cable types. The evaluation speed in the image processing system may also be improved. The AI module works flexibly with various cable types and also with different terminals.

The AI module preferably comprises at least one neural network, which is designed to analyse the at least one detected image, wherein for example the neural network is teachable with the aid of the at least one detected image. The neural network is teachable with image parameters, in order to enable improved future testing of the process work steps in the cable processing station, with a view to attaining the ideal cable processing process depending on the quality of the training images and reference images or reference contours. The AI module further enables execution of the cable processing process and/or the multiple process work steps involved therein, largely independently of operator intervention, since the neural network takes over the tasks of the operator. Standstill time at the cable processing station is thus minimised, since in the event of a change of order from a first cable processing process to another cable processing process for example a teaching procedure is not needed for the neural network and no adjustment steps have to be made on the cable processing machine by the operator.

Also preferably, the AI module carries out a semantic segmentation of the at least one detected image, to assign at least one cable-specific image parameter to each pixel of the detected image, and to transfer the first analysed cable-specific image parameter and at least the second analysed cable-specific image parameter to the image processing system. Image processing of such kind is disclosed for example in Liang-Chieh Chen et. al "Encoder-Decoder with Atrous Separable Convolution for Semantic Image Segmentation", Google Inc, 2018, arXiv:1802.02611, wherein the detected image is processed. In this case, a background signal is assigned as a cable-specific parameter to a pixel of the detected image when a cable end or cable is not present for this pixel of the detected image.

In an alternative embodiment, the image processing system is configured to carry out a segmentation of the at least one detected image. The detected image is processed in such manner that it is filtered and/or analysed, for example, so that the analysed image is obtained in higher image quality, particularly in those regions in which the cable end of the cable is identifiable, and consequently a better determination can be made of a first analysed cable-specific image parameter and a second analysed cable-specific image parameter. The image processing system advantageously includes an arithmetic unit which simply executes at least the previously listed analyses and/or computation steps. Alternatively or additionally, the image processing system is configured to divide the at least one detected image of the cable end of the cable into at least two material-specific regions on the basis of the first cable-specific image parameter and the second cable-specific image parameter. One material-specific region and another material-specific region differ from each other in the captured image in that they at least include different materials. In this way, the cable end of the cable may be divided into at least two regions easily, so that the image processing system can identify nuisance cable isolation residues or other foreign bodies on the cable end for example. In a coaxial cable, this simple division also makes it possible to easily identify undesirable cut wires on the dielectric in the cable shield, and so make it possible to prevent short circuit or detective high-frequency connections on the processed cable afterwards.

The image processing system is preferably configured to divide the at least one detected image of the cable end of the cable into at least two material-specific regions on the basis of the first analysed cable-specific image parameter and the second analysed cable-specific image parameter. In this way, the previously described undesirable cable isolation residues or other foreign bodies on the cable end may be identified more efficiently, since the detected image is filtered for example to obtain analysed, cable-specific image parameters. Additionally, a cable shield folded back on the cable or cable foil of a high-voltage cable may be identified for example with the aid of the differentiation between material-specific regions on the image. Subsequent interruptions to the cable processing process may thus be prevented later, and at the same time the end products may be produced in better quality, such as the service life of the processed cable, for example.

The first material-specific region preferably comprises at least the electrical conductor of the cable, and the second material-specific region comprises at least the cable isolation or a cable shield (in a coaxial cable or high-voltage cable, for example). These material-specific regions may also be analysed by the image processing system in respect of their surface area and border structure, also called the contour, to analyse boundary areas between the first material-specific region and the second material-specific region for example. For example, the image processing system is configured to identify and/or measure and/or calculate the surface area, the area circumference and/or the area diameter or the border structures of the respective material-specific regions. For example, it may happen that a cable strand of the electrical conductor is nicked during the process work step of stripping the cable isolation and the process work step of removal contained therein, and after the cable isolation has been removed a single cable strand protrudes or projects from the electrical conductor. With the identification of the aforementioned material-specific regions by the AI module and/or the image processing system, in the analysed image it may now be determined whether this is a protruding cable strand or a fragment of the cable isolation. If unavoidable, a fragment of the cable isolation on the tip of the electrical conductor may be tolerated for purposes of the subsequent process work steps when a terminal is fitted. In comparable known methods, such as a silhouette method, it is not possible to distinguish between the material of the protruding object and the material of the other objects in the detected image, with the result that false error messages occur and lead to the rejection of a usable cable.

The stripping knife is a rotary knife, for example, wherein the controller is configured to provide a control-specific parameter, in order to adapt the cutting depth (e.g., set deeper) of the rotary knives automatically when processing the cable, for example a coaxial cable, so that the rotary knife is able to carry out the cutting process again if at least a single electrical conductor is not cut off while cutting off the shield layer and has been detected as a material-specific region (material zone) on the dielectric. These uncut single strands can be critical, as they can bring about a short circuit in the connector at a later time in the lifecycle of the finished cable. This post-processing of the unfinished cable end also offers the advantage that a cable which has already been cut to length does not have to be disposed of, which in turn results in reduced consumption of raw materials.

Moreover, in the case of a sheathed cable, for example, with multiple electrical conductors or a shielded multiconductor cable with filler, the alignment of the electrical conductors is detected and analysed with the aid of the image processing system in such manner that a frontal image is measurable. With the aid of the analysed alignment of the electrical conductors, in a second step a rotary module is actuated as a first tool using the control-specific parameters of the controller, and aligns the electrical conductors horizontally in the sheathed cable. In order to calculate the angle of rotation for the rotary module, the measured alignment is calculated in the arithmetic unit using the known twist of the electrical conductors, so that in a following step with a form knife as a further tool, a cut can be made in the sheath or the filler without damaging the electrical conductors contained therein. For the previously described subsequent process step, the controller contains further control-specific parameters and is configured to control the form knife in the subsequent process step.

Preferentially, a database is provided, and is connected to the image processing system, wherein the database includes at least one memory unit, and reference images for various cable ends are stored in the at least one memory unit. At least one, advantageously multiple reference images for various cable types are saved in the memory unit of the database and can be processed in the cable processing station, and can be retrieved by the image processing system. At the beginning of a cable processing process, an order with order data relating to the cable that is to be processed is typically transmitted to the controller of the cable processing station, which is able to access the database and its content. The image processing system compares the detected and/or analysed images with the reference images from the database and/or with the information about the present order. The reference images have segmented regions, for example, which can therefore be compared easily with the detected and/or analysed image. Thus, the cable processing process can be performed without an operator. The order data for the cables or cable types that are to be processed contain among other things control datasets and/or control-specific parameters for controlling the first tool and corresponding control tolerances and cable-specific image parameters and/or material-specific regions together with tolerance values, so that those processed cables which are within the respective tolerances can be processed further. In this way, the amount of faulty cable ends rejected can be reduced and productivity at the cable processing station is increased.

Alternatively or additionally, a database is provided which is connected to the image processing system, wherein the database has at least one memory unit, and reference contours for various cable ends and/or sealing element and/or terminals are stored in the at least one memory unit. At least one, advantageously multiple reference contours relating to various cable types are stored in the memory unit and can be processed in the cable processing station and can be retrieved by the image processing system. At the beginning of a cable processing process, an order with order data relating to the cable that is to be processed is typically transmitted to the controller of the cable processing station, which is able to access the database and its content. The image processing system compares the detected and/or analysed images with the reference contours from the database and/or with the information about the present order. The order data for the cables or cable types that are to be processed contain among other things control datasets and/or control-specific parameters for controlling the first tool and corresponding control tolerances and cable-specific image parameters and/or material-specific regions together with tolerance values, so that those processed cables which are within the respective tolerances can be processed further. In this way, the amount of faulty cable ends rejected can be reduced and productivity at the cable processing station is increased.

The reference contours are advantageously stored individually as a contour vector. The contour vector can easily be assigned to the detected or analysed image, wherein the data volume of a contour vector is small compared with the data volume of a reference image, so processing of the data is made faster.

Control-specific parameters and/or control datasets are advantageously stored in the database, and can be used for controlling or regulating the at least one first tool. The control-specific parameters and/or control datasets may be transmitted to the controller, enabling it simply to control the drive of the at least one first tool.

Alternatively or additionally, the database is connected to the AI module, wherein reference images for various cable ends are stored in the at least one memory unit of the database. The image processing system compares the detected and/or analysed images with the reference images from the database without the need for operator intervention.

Alternatively or additionally, the database is connected to the AI module, wherein reference contours for various cable ends are stored in the at least one memory unit of the database. The image processing system compares the detected and/or analysed images with the reference contours from the database without the need for operator intervention. As explained previously, the reference contours may be stored in the database in the form of a contour vector.

Alternatively or additionally, at least one setpoint for at least one cable-specific image parameter is stored in the memory unit of the database. These setpoints may be setpoints for the stripping length of the cable end and/or the width or thickness of the electrical conductor, and they typically include tolerance values for the respective setpoints for the respective cable type. These setpoints further include symmetry values or ratio values, such as a ratio between the stripping length and the thickness of the electrical conductor, for example, or the cable type that is currently undergoing the cable processing process.

Alternatively or additionally, at least one setpoint for at least one material-specific region is stored in the memory unit of the database. These setpoints may be setpoints for the surface area, the area circumference and/or the area diameter or for the border structure of the respective material-specific region, or a combination of said values, and may include corresponding tolerance values. For example, the image processing system may retrieve these setpoints individually or in bundles, and compare them with the identified material-specific region.

The arithmetic unit is advantageously configured to create at least one deviation value which can easily be processed further from a comparison between the at least one setpoint and a measured cable-specific image parameter.

The image processing system is preferably configured to record at least the first cable-specific image parameter and/or at least the first analysed cable-specific image parameter from the detected image of the cable end of the cable with the aid of an image measuring method. The image measuring method comprises at least one image measuring algorithm, which is disclosed for example in S. and Abe, K., "Topological Structural Analysis of Digitized Binary Images by Border Following", CVGIP 30 1, pp 32-46 (1985). This can be used to calculate the border structures of the material-specific regions. The border structures can be divided into contour points and then filtered mathematically using a direction vector to obtain only the measurement points of the cutting edges. In a further step, the median, the 10%-quantile and the 90%-quantile of the measurement points in the longitudinal axis of the cable can be evaluated statistically. An attribute of the cut quality in the cable processing process can be derived from the statistical dispersion of the measurement points on the cutting edge in the longitudinal axis of the cable. Additionally, a cable-specific parameter may include for example a stripping length on the cable end, and may thus be a measure of length.

Alternatively or additionally, the image measuring algorithm is configured to measure the detected image geometrically in a first step, in order to determine the first cable-specific image parameter and the second cable-specific image parameter. In such case, the detected image is processed in such manner that in a first step the stripping length at the cable end is determined as a first cable-specific image parameter, by measuring the length from the end of the electrical conductor as far as the cable isolation on the detected image. At the same time, the second cable-specific image parameter is determined by identifying the boundary area with or the start of the cable isolation. Based on the shape of the identified boundary area with the cable isolation, it is possible to determine for example the position of the cable in the cable processing station and/or the correct stripping of the cable isolation from the cable end and/or the correct positioning of a sealing element an the cable end can be determined or checked. Alternatively or additionally, the image measuring algorithm is configured to identify contaminants or production residues on the detected image, so that a further quality criterion for an ideal cable processing process may be satisfied.

The first cable-specific image parameter and/or the second cable-specific image parameter is/are preferentially taken at least from the group of the colour or structure or shape of the electrical conductor and/or the cable isolation and/or a cable shield and/or a sealing element. In this way, different colours and/or different structures and/or different shapes can be identified on the at least one detected image.

For example, colour identification enables a rapid differentiation to be made between the electrical conductor and the cable isolation. Colour identification may also be used to identify the material of the electrical conductor and for example to distinguish between electrical conductors made from copper or aluminium. Besides this, coatings such as for example tinnings on the electrical conductor maybe determined. For example, if the colour of the sealing element is identified with the first cable-specific image parameter and the border structure of the sealing element is identified and/or checked using the second cable-specific image parameter, interruptions in the cable processing process may be prevented subsequently, and at the same time the consumption or rejection of terminals and/or cable material may be minimised.

Structure identification enables for example a differentiation to be made between an electrical conductor consisting of individual cable strands and a single-wire electrical conductor. Structure identification also captures different materials of the cable isolation. Moreover, structure identification makes it possible to verify a fault free cable and/or sealing element and/or terminal. For example, this makes it possible to identify a faulty sealing element which has consequently been positioned incorrectly on the cable end. In particular, the faulty sealing element may be identified before it is positioned on the cable end, so that further processing of this cable is prevented. This in turn enables possible rejection to be detected promptly, so that the performance of further cable processing steps with a faulty sealing element is preventable.

Shape identification enables for example a differentiation to be made between an unclean or poorly cut cable isolation after stripping the sheathing at the cable end. Shape identification further enables a differentiation to be made between an untwisted cable end and a twisted cable end, and for example misalignment of one or more conductor wires relative to the desired orientation of the cable end of the cable. For example, it may happen that when a sealing element is fitted on the cable end at least one conductor wire is positioned on the cable end in such manner that site is created on the cable end where a leak can occur, which causes corrosion damage to the processed cable later. As explained earlier, the image processing system and/or the AI module automatically identifies the different material-specific regions belonging to the electrical conductor, the cable isolation and the sealing element, and prevents the subsequent, production of faulty cables. The previously described identifications can each be carried out either separately or in various combinations, during and after processing of the cable end of the cable with the first tool. The AI module is preferably configured to capture at least one further cable-specific image parameter from the at least one detected image. Accordingly, the least one control-specific parameter is based on at least one further item of information about the cable end of the cable, or also on a process parameter in the cable processing process. This process parameter may include for example a position in which the cable end is inserted in the first tool. The further cable-specific image parameter is identified in the same way as the image parameters described previously. Alternatively or additionally, the image processing system is configured to capture the at least one further cable-specific image parameter from the at least one detected image.

In particular, a terminal for the cable end of the cable is to be assigned to the further cable-specific image parameter. For example, the insertion position of the cable end inside the terminal may be calculated by an evaluation of the lengths of the material-specific region of the cable end and of the material-specific region of the terminal relative to each other. In particular, the previously described image measuring algorithm may be used to calculate how the region of the electrical conductor and the region of the cable isolation are divided up it is also possible to measure how far the tip of the electrical conductor protrudes beyond the foremost fastening area on the terminal by calculating the length of the leading material specific region of the electrical conductor.

The control device is preferentially designed to pause and/or prevent a process work step by the at least one first tool on the basis of the at least one control-specific parameter. The process of screening out cable ends which have not been processed correctly ensures that no faulty cables are produced. This in turn increases process reliability and consequential damage to the equipment caused by the processed cables is avoided.

The computer-implemented method according to the invention for automatically determining and generating control datasets and/or control-specific parameters for controlling at least one cable processing station that processes at least one cable end of a cable, wherein at least one image of the at least one cable end of the cable is detected with a first imaging sensor device, and at least one control dataset and/or one control-specific parameter is generated and saved automatically, and an image processing system is present which receives the at least one detected image and identifies a first cable-specific image parameter and at least one second cable-specific image parameter, and generates the at least one control dataset and/or the at least one control-specific parameter on the basis of the first cable-specific image parameter and the second cable-specific image parameter.

The at least one control-specific parameter and/or at least one control dataset is generated on the basis of a combination of the at least one first cable-specific image parameter and the second cable-specific image parameter. The combination of the at least one first cable-specific image parameter and the second cable-specific image parameter subsequently leads to a specific cable type in the image processing system, which type is in particular processed with the cable processing station described in the present document or is intended for processing in said cable processing station. The first tool is subsequently controlled or regulated on the basis of the at least one control-specific parameter in such manner that rapid tracking of the cable processing process at the cable processing station is possible.

The control dataset and/or the control-specific parameter control or regulate at least the motion or the work activity at least of the first tool. In such case, the first tool may for example be movable from an initial state to an end state, and/or may be activated and/or deactivated. These movements typically include control tolerances.

Preferably, at least one control-specific parameter is transmitted to the controller, by which it is then possible to control and/or regulate at least the first tool directly and automatically.

Preferably at least one control dataset is transmitted to a memory unit. Consequently, said at least one control dataset may be saved simply in the memory unit and stored for an extended period so that it can be accessed at a later time. Preferentially, the first cable-specific image parameter and at least the second cable-specific image parameter are captured from the at least one detected image with the aid of an AI module, wherein the AI module analyses and processes the at least one detected image. The AI module works flexibly and automatically identifies various cable types and also different terminals.

Alternatively or additionally, the first cable-specific image parameter and at least the second cable-specific image parameter are captured from the at least one detected image with the aid of the image processing system, wherein the image processing system analyses and processes the at least one detected image. In this way, cable-specific parameters may be provided for the further process simply and quickly. A semantic segmentation of the at least one detected image is preferably performed and at least one cable-specific image parameter is assigned to each pixel of the detected image. In such case, the detected image is filtered and analysed, for example, so that the analysed image is produced with higher image quality, particularly in those regions in which the cable end of the cable is identifiable, and thus a first analysed cable-specific image parameter and a second analysed cable-specific image parameter is determined.

The AI module is advantageously taught using the at least one cable-specific image parameter, wherein it comprises a neural network. The neural network is teachable with cable-specific image parameters in order to generate improved control datasets and/or control-specific parameters depending on the quality of the training images and/or reference images in the future, and to carry out improved testing of the process work steps in the cable processing station. The AI module additionally enables the cable processing process and the multiple process work steps that take place therein to be performed largely without operator intervention, since the tasks of the operator are taken over by the neural network. Standstill time at the cable processing station is minimised, since a teaching operation of the neural network is not required and no adjustment steps need to be performed on the cable processing machine by the operator in the event or an order change from a first cable processing process to another cable processing process, for example.

The at least one detected image of the cable end of the cable is preferably divided into at least two material-specific regions on the basis of the first cable-specific image parameter and the second cable-specific image parameter. A material-specific region differs from a further material-specific region in that they at least contain different materials. In this way, the cable end of the cable can be divided easily into at least two regions so that the image processing system can identify undesirable cable isolation residues or other foreign bodies on the cable end, for example. Moreover, in the case of a coaxial cable this simple division makes it possible to easily identify undesirable cut wires on the dielectric in the cable shield, and thus make it possible to prevent a subsequent short circuit or unsatisfactory high-frequency connections on the processed. cable end.

The at least one detected image of the cable end of the cable is preferably divided into at least two material-specific regions on the basis of the first analysed cable-specific image parameter and the second analysed cable-specific image parameter. This enables the previously described undesirable cable isolation residues or other foreign bodies on the cable end to be identified more effectively, since the detected image is filtered, for example, to obtain analysed cable-specific image parameters. Thus subsequent interruptions later in the cable processing process can be prevented and at the same time the end products are produced with higher quality, such as the service life of the processed cable, for example.

The first material-specific region is preferably assigned to the electrical conductor of the cable, and the second material-specific region is assigned to the cable isolation. Then, particularly the material-specific regions are measured and/or analysed in respect of their surface area and/or region length and/or their border structure. In order to simply identify boundary areas between the first material-specific region and the second material-specific region for example. The position of the first tool and the control-specific parameter associated therewith is calculated on the basis of the size (length times width) of the material-specific region. The measurement of the region length may be used to determine the change of position of the stripping knife which is designated as the first tool. This process work step is improved since the material-specific regions consist of multiple measurement points, so that there are not only measurement points at which the cable isolation extends beyond the electrical conductor, but also measurement points on the detected and analysed image for which a change from the first material-specific region to the second material-specific region is identified.

For the measurement, an image measuring algorithm is used which measures the image geometrically, wherein one of the image measuring algorithms is disclosed in S. and Abe, K., "Topological Structural Analysis of Digitized Binary Images by Border Following", CVGIP 30 1, pp 32-46 (1985) for example. With this, it is possible to measure a large number of measurement points and then calculate the border structures of the material-specific regions. The border structures can be divided into contour points and then filtered mathematically using a direction vector to obtain only the measurement points of the cutting edges. In a further step, the median, the 10%-quantile and the 90%-quantile of the measurement points in the longitudinal axis of the cable are evaluated statistically. An attribute of the cut quality in the cable processing process is derived from the statistical dispersion of the measurement points at the cutting edge in the longitudinal axis of the cable. In this way, the optimum time for replacing the stripping knives can be specified.

Preferentially, the at least one cable-specific image parameter is compared with a setpoint for said cable-specific image parameter, and at least one control-specific parameter is generated on the basis of this comparison. These setpoints may be setpoints for the stripping length of the cable end and/or the width or thickness of the electrical, and typically include tolerance values for the respective setpoints for the respective cable type. The setpoints further include symmetry values and/or ratio values, such as a ratio between the stripping length and the thickness of the electrical conductor and/or the cable type that is currently undergoing the cable processing process. The control-specific parameters derived therefrom may include for example the positions of the stripping knife when cutting into the cable isolation and/or the removal length when stripping the cable isolation from the cable.

Alternatively or additionally, the at least one cable-specific image parameter is compared with a setpoint for said cable-specific image parameter, and at least one control dataset is generated on the basis of this comparison. A control dataset typically includes a number of control-specific parameters for controlling one or more tools of the cable processing station. A single comparison of the at least one cable-specific image parameter with a corresponding setpoint allows a conclusion to be drawn about the cable type in the cable processing station, so that it becomes automatically controllable, and a cable processing process is carried out.

Alternatively or additionally, the at least one material-specific image parameter is compared with a setpoint for said material-specific image parameter, and at least one control dataset is generated on the basis of this comparison. A control dataset typically includes a number of control-specific parameters for controlling one or more tools of the cable processing station. A single comparison of the at least one material-specific region with a corresponding setpoint allows a conclusion to be drawn about the type and dimension of the cable material, and subsequently of the cable type in the cable processing station, so that it becomes automatically controllable, and a cable processing process is carried out.

An average is calculated in the image processing system preferably after the comparison of the cable-specific image parameter with the corresponding setpoint, and is compared with the respective tolerance value or setpoint, and thereafter a tracked control-specific parameter is generated. The calculation of an average enables filtering of an anomalous value such as an exceptional deviation from the deviation value, for example.

Alternatively or additionally, an average is calculated in the image processing system after the comparison of the material-specific region with the corresponding setpoint, and is compared with the respective tolerance value or setpoint, and thereafter a tracked control-specific parameter is generated.

The measured cable-specific image parameter is compared with the corresponding setpoint, preferably in the image processing system, wherein a deviation value is generated from the comparison. This in turn serves to improve the subsequent cable processing process.

In the event of a deviation between the comparison parameters, the cable currently in the cable processing process is advantageously disposed of, ensuring that no faulty cables remain in the cable processing process.

The cable processing machine according to the invention, with at least two cable processing stations, wherein at least one cable processing station is constructed as described in the present document and with which a computer-implemented method as described in the present document can be operated, includes an image processing system. The image processing system is connected to a central controller for exchanging control-specific parameters and/or control datasets. The image processing system is configured to create at least one control-specific parameter and/or one control dataset on the basis of the first cable-specific image parameter and the second cable-specific image parameter, and to transmit it to the central controller for controlling at least one of the tools of at least one of the two cable processing stations. In this way not only can single cable processing stations be controlled fully automatically. The control-specific parameter and/or a control dataset are forwarded to the central controller instead of to the individual controllers of the cable processing stations. Consequently, the cable processing machine has high processing reliability for processing cables without the need to assign an operator to man the cable processing machine.

The first imaging sensor device is, preferentially designed to detect the at least one image of the cable end of the cable, wherein the cable end of the cable is in the state of not having been processed by the cable processing station. In this way, at least one material-specific region may be determined on the basis of the at least one detected image and in particular with the previously described embodiments of the cable processing station, which region may be used to determine the cable type of the cable, for example. Further, a first test of the unprocessed cable may be performed, making it possible for damaged cable ends to be rejected early.

The first imaging sensor device is preferably designed to detect a second image of the cable end of the cable, wherein the cable end of the cable is in the state of having been processed by at least one cable processing station. In this way, a first control-specific parameter for controlling the first tool is created early, wherein it is based o the embodiments of the cable processing station described here. The first imaging sensor device is advantageously designed to detect a separate image of the cable end of the cable at each existing cable processing station, wherein the cable end of the cable is in the state of having been processed by the respective cable processing station. In this way, an entire cable processing process with multiple cable processing stations may quickly be tracked individually after deviations from an ideal cable processing process have been observed. At the same time, high processing reliability for processing cables is guaranteed.

A computer software product according to the invention which can be loaded directly into the internal memory of the central controller of a cable processing machine as described herein and/or a control device of a cable processing station. as described herein and includes control-specific parameters and/or control datasets, with which the steps according to one of the previously described methods are executed when the computer software product runs on the cable processing station or cable processing machine according to the invention.

Further advantages, features and particularities of the invention are discernible from the following description, in which exemplary embodiments of the invention are described with reference to the drawings.

The list of reference numerals is an integral part of the disclosure as are the technical content of the claims and the figures. The figures are described sequentially and comprehensively. Identical reference signs denote identical components, reference signs with different indices refer to functionally equivalent or similar components.

Figure 2:
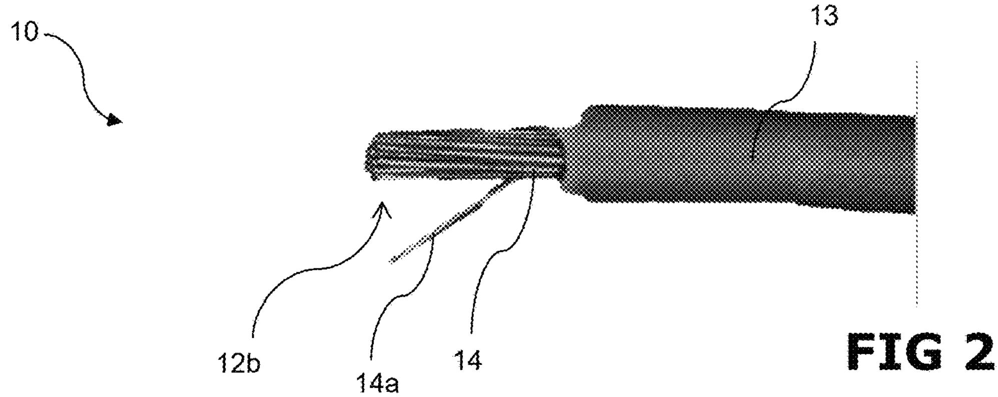
Figure 3:
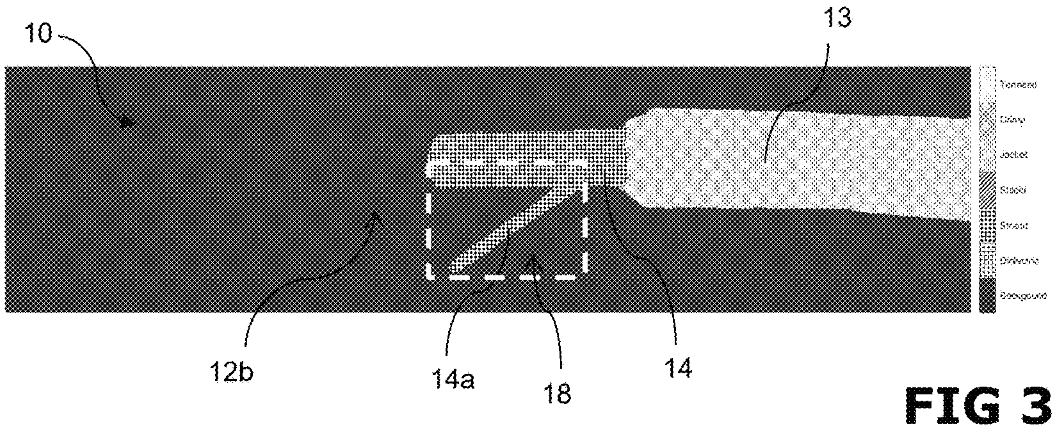
Figure 4:
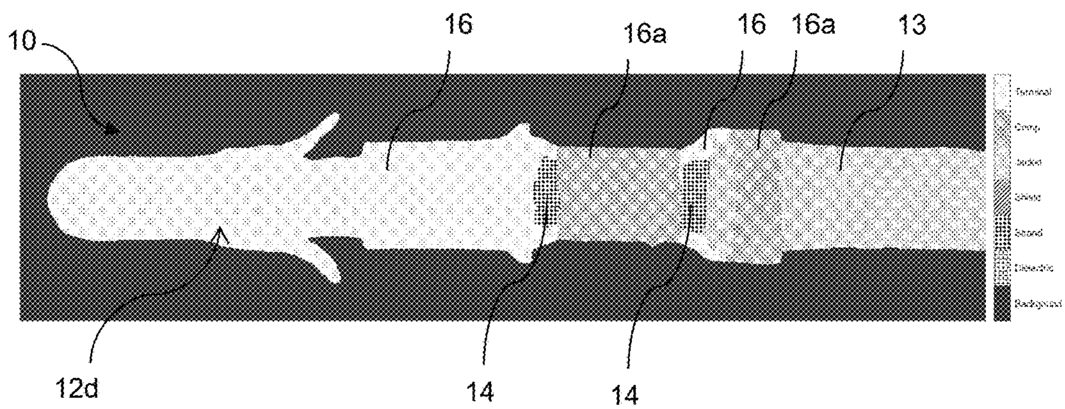
Figure 5:
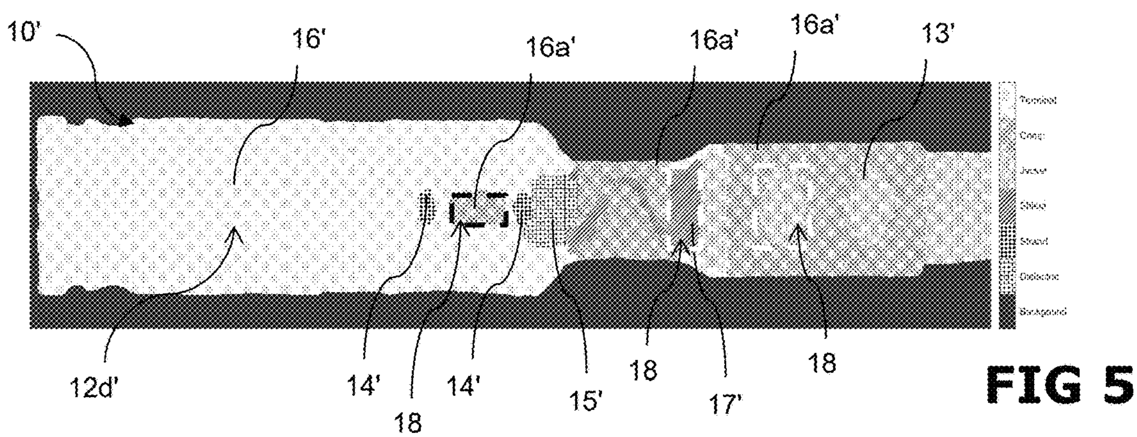
Figure 6:
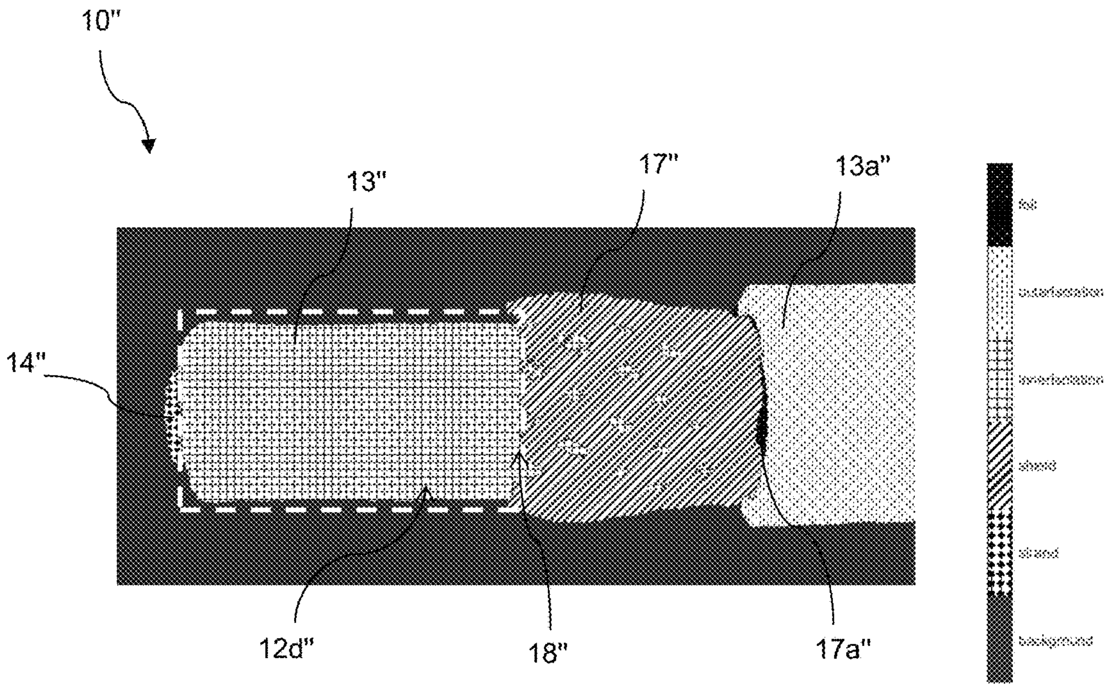
Figure 7:
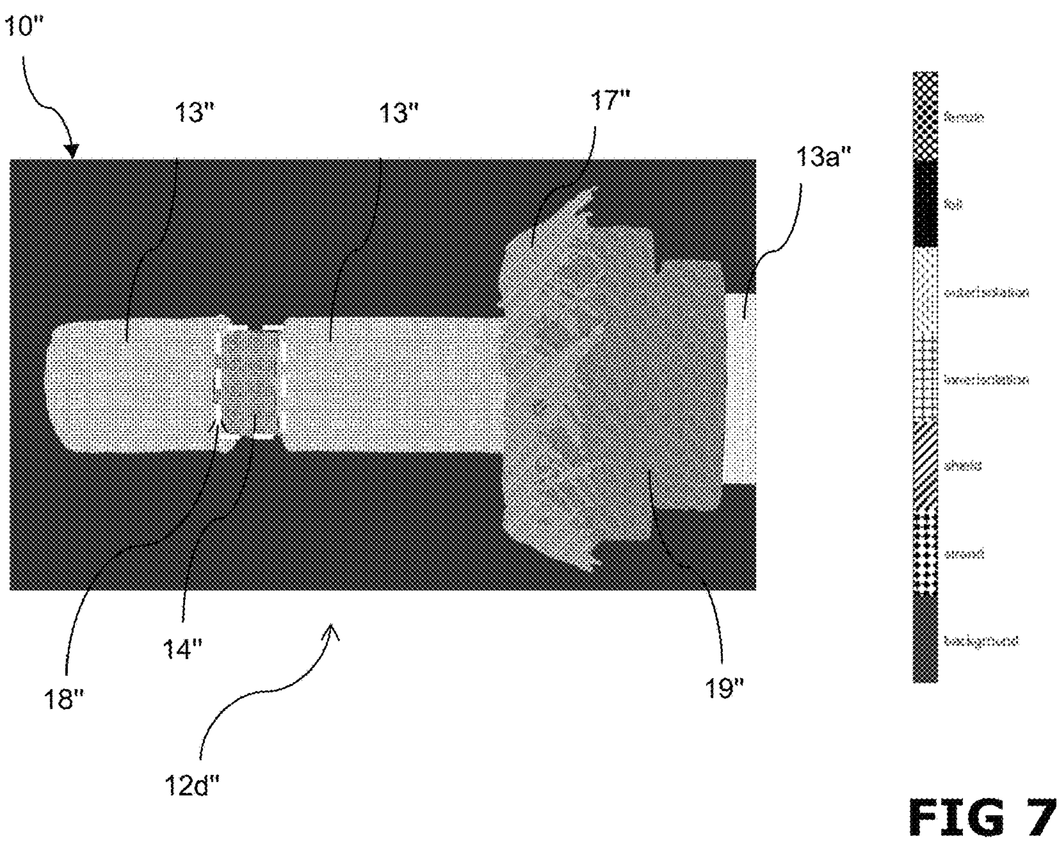
Figure 8:
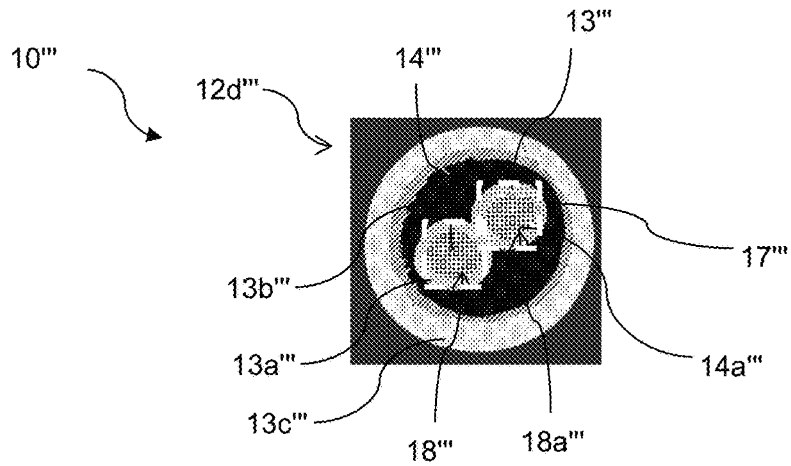
Figure 9:
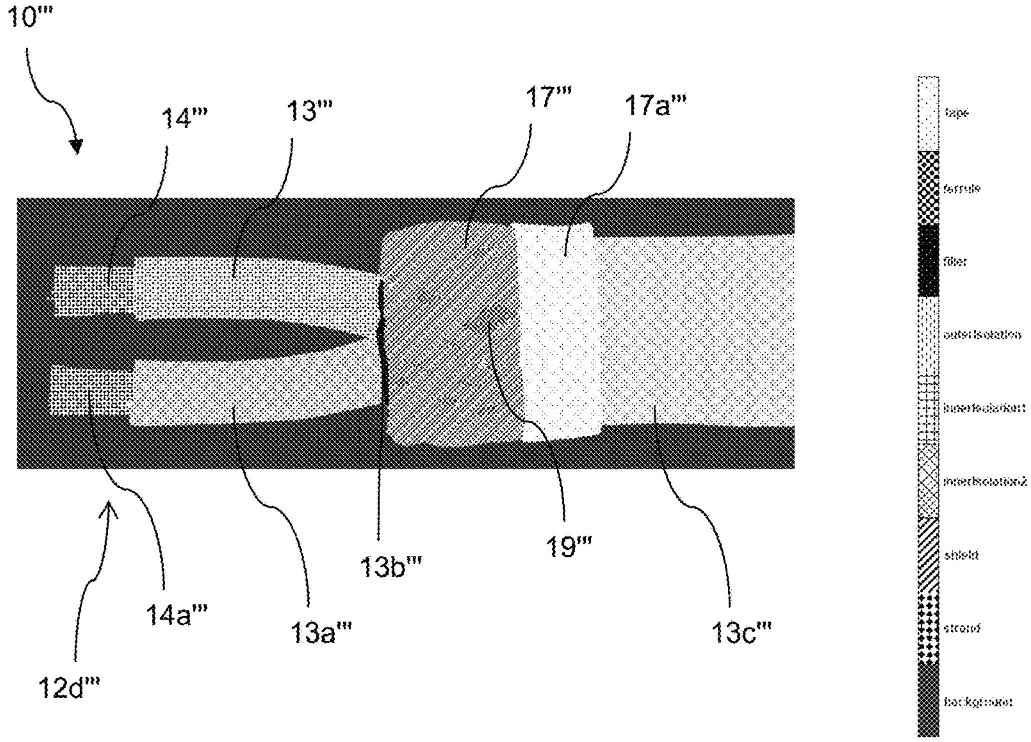
Figure 10:
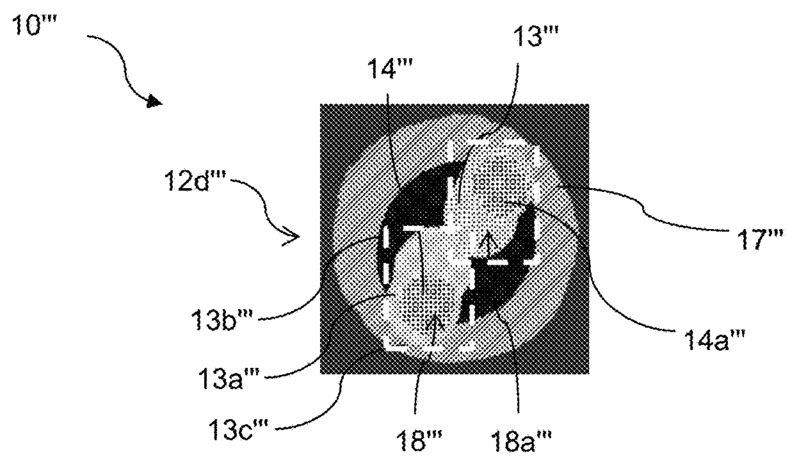
Figure 11:
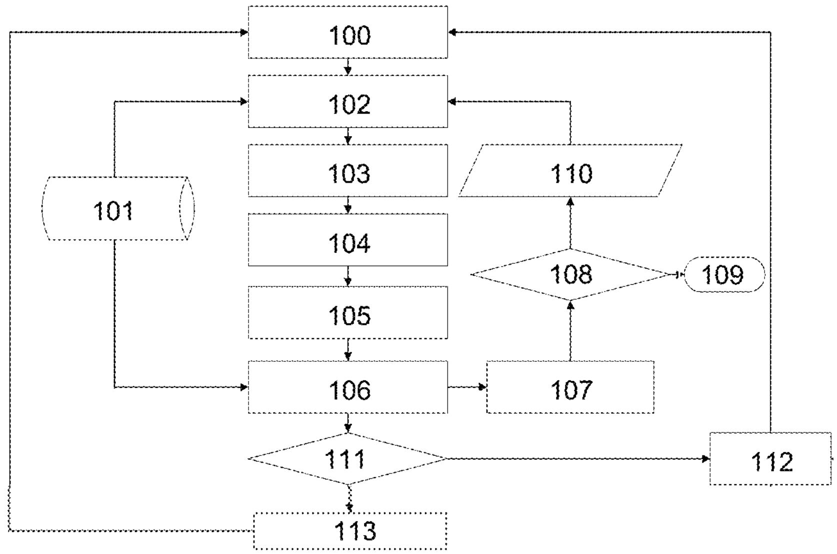
Figure 12:
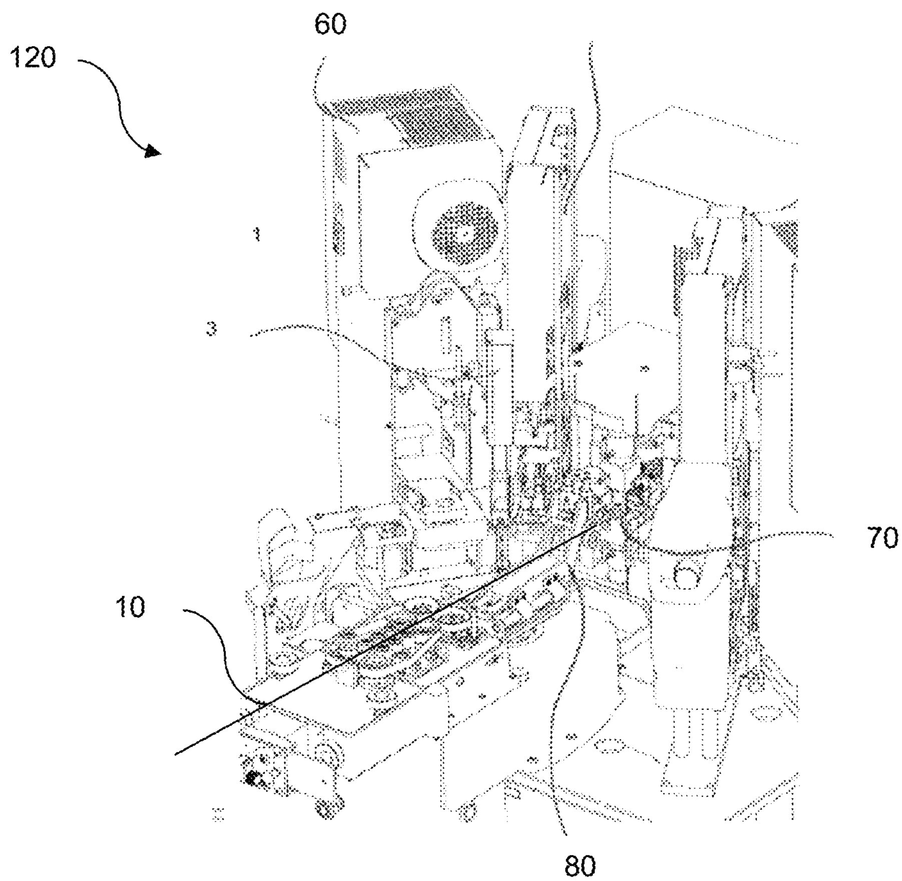
Figure 13:
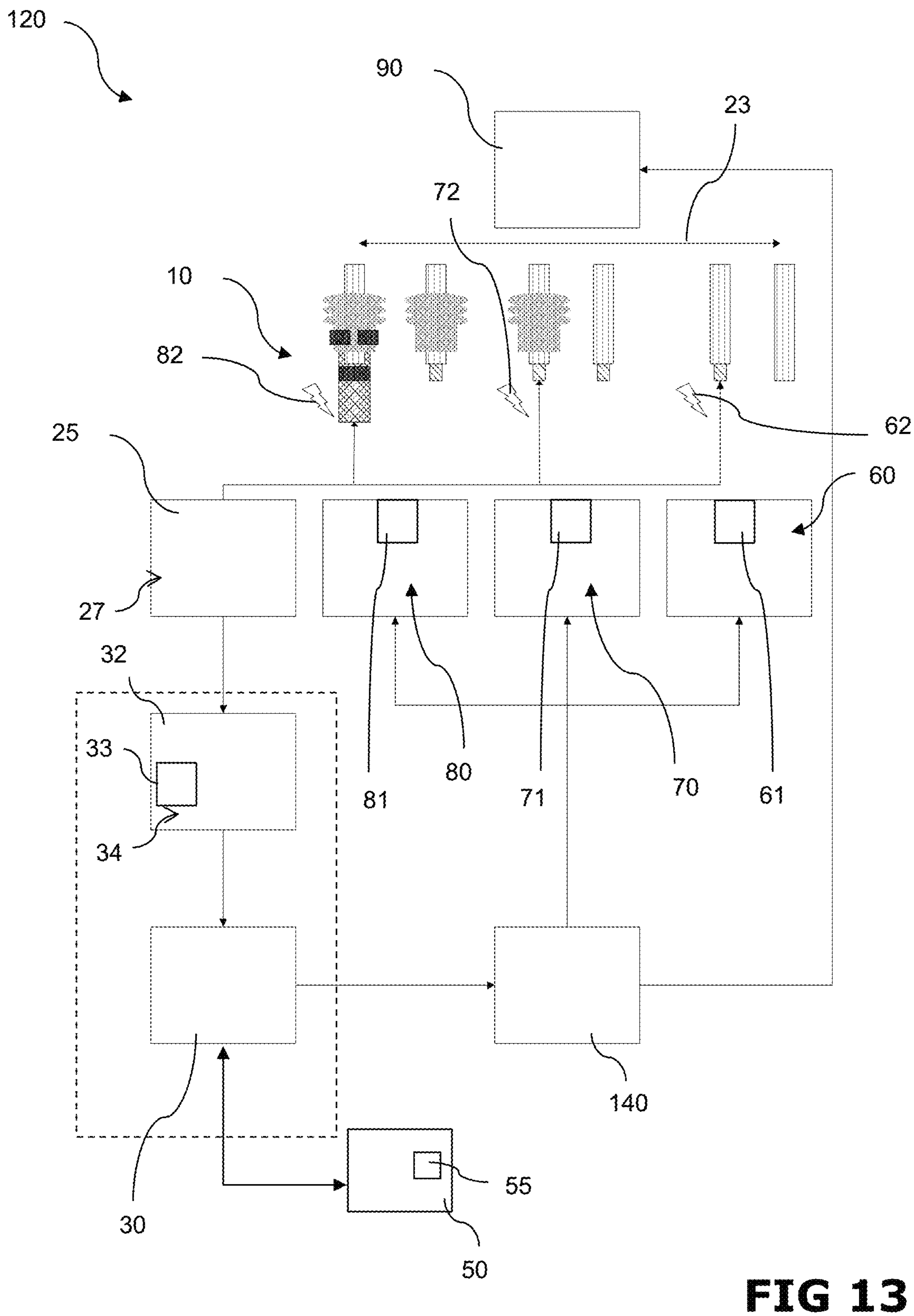
Figure 14:
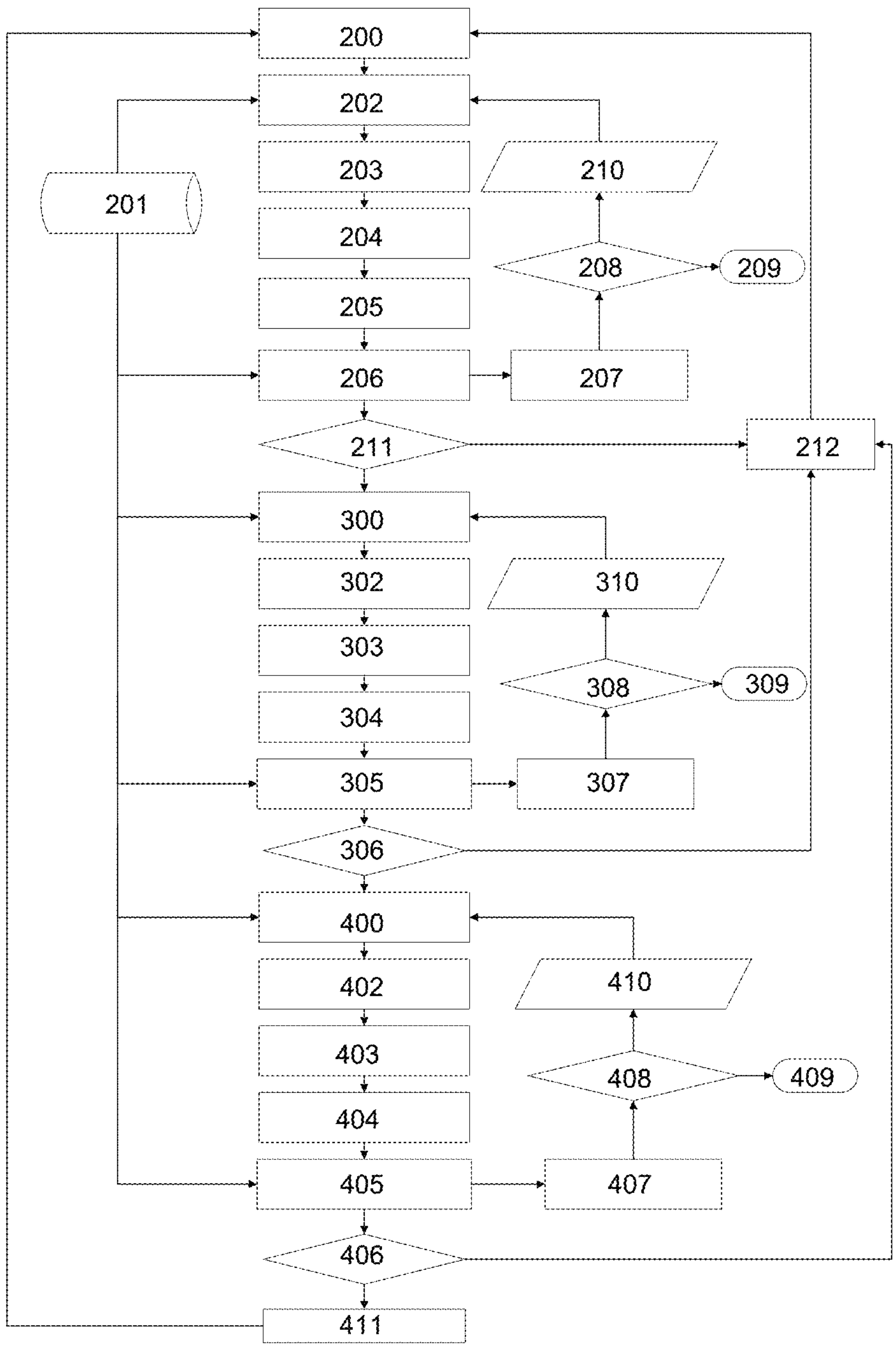

In the drawing:

FIG. 1 is a schematic representation of a first embodiment of a cable processing station according to the invention, FIG. 2 is a representation of an image of a first cable end of the cable detected with the sensor device, FIG. 3 is a representation of a segmented image according to the image in FIG. 2, FIG. 4 is a representation of a segmented image according to the image in FIG. 3 with a first terminal, FIG. 5 is a representation of a segmented image of a further cable end of a further cable with a further terminal, FIG. 6 is a representation of a segmented image of a cable end of a high-voltage cable, FIG. 7 is a representation of a further segmented image according to the image of FIG. 6 with a ferrule on the high-voltage cable, FIG. 8 is a representation of a front face view of a segmented image of a cable end of a further high-voltage cable, FIG. 9 is a representation of a side view of a further segmented image according to the image of FIG. 8 with an adhesive strip on the high-voltage cable, FIG. 10 is a representation of a front face view of a further segmented image according to the image of FIG. 0, FIG. 11 is a first flow diagram which discloses a method for controlling the cable processing station, FIG. 12 shows a perspective representation of a cable processing machine according to the invention with a cable processing station according to FIG. 1, FIG. 13 is a schematic representation of the cable processing machine according to FIG. 12, and FIG. 14 is a further flow diagram which discloses a method for controlling the cable processing machine according to FIG. 12.

FIG. 1 shows a cable processing station 20 for processing a cable ends 12 of an electrical cables 10, which comprises at least a first tool 22 for processing the cable 10 and a control device 40 for controlling the at least first tool 22. The cable 10 shown is represented with various cable ends 12*a*-12*d*, which are processable in various process work steps at the cable processing station 20 with at least the first tool 22. The cable 10 with the cable end 12*a* is unprocessed and has a cable isolation 13 which partially surrounds the electrical conductor 14, and which protrudes at the frontal face of the cable 10. After a further process work step the same cable 10 is equipped with cable end 12*b*, wherein the electrical conductor 14 is exposed after the isolation has been stripped, and the cable isolation 13 has been removed in the area around the cable end 12*b*. After a further process work step the same cable 10 has the cable end 12*c*, wherein a sealing element 15 is fitted in the area of the cable end 12*c*. After a further process work step the same cable 10 has a cable end 12*d*, wherein a terminal 16 is fitted in the area of the cable end 12*d* and is crimped. The first tool 22 of the cable processing station 20 and the cable 10 are movable relatively towards each other in the direction of motion 23, wherein depending on the process work step the first tool 22 comprises (not a full list) a stripping knife for stripping the cable isolation 13, a fitting device for fitting the sealing element 14, and a crimping tool for crimping the terminal 16 to the cable 10. The cable processing station 20 further comprises at least one first imaging sensor device 25 for detecting at least one image of the cable ends 12*a*-12*d* of the cable 10, and an image processing system 30. The first imaging sensor device 25 is a camera and which has a zoomable lens and various standard commercial filter elements 27. The image processing system 30 is electrically connected to the control device 40 for exchanging control-specific parameters, and is configured to identify a first cable-specific image parameter and at least one second cable-specific image parameter from the at least one detected image, and to create at least one control-specific parameter on the basis of the first cable-specific image parameter and the second cable-specific image parameter and transmit it to control device 40 for controlling the first tool 22. The electrical conductor 14 is identified as the first cable-specific image parameter, for example, and the cable isolation 13 is identified as the second cable-specific image parameter. This enables the image processing system 30 to identify the specific cable type of the cable 10. The image processing system 30 includes an AI module 32, which is connected to the at least one first imaging sensor device 25 and is configured to capture the first cable-specific image parameter and at least the second cable-specific image parameter from the at least one detected image. An AI (Artificial Intelligence) module can be taught for example with external and/or separate image data or parameters (material, structure, colour, shape, etc.) for the respective cable type. For this, the AI module 32 has an arithmetic unit 33 as well as a neural network 34 which is designed to analyse the at least one detected image, wherein the neural network 34 is teachable.

The AI module 32 carries out a semantic segmentation of the at least one detected image, to assign at least one cable-specific image parameter to each pixel of the detected image, and to transfer the first analysed cable-specific image parameter and at least the second analysed cable-specific image parameter to the image processing system 30. The image processing system 30 is configured to divide the at least one detected image of the cable end 12*a*-12*d* into at least two material-specific groups (see also FIGS. 3 and 4) on the basis of the first analysed cable-specific image parameter and the second analysed cable-specific image parameter. One material-specific region is distinguished from another material-specific region in that they at least include different materials. In addition, a database 50 is present, and is connected electrically to the image processing system 30, wherein the database 50 contains a memory unit 55. Reference images for various cable ends 12*a*-12*d,* various cable types, and/or sealing elements 15 and terminals 16 are saved in the memory unit 55 and can be processed in the cable processing station 20 and retrieved by the image processing system 30. Reference contours are also saved in the memory unit 55 as contour vectors to various cable ends 12*a*-12*d,* various cable types, and/or to sealing elements 15 and terminals 16, which are processable in the cable processing station 20 and can be retrieved by the image processing system 30. Control-specific parameters and/or control datasets are also saved in the database 50, and they can be used to control or regulate the at least first tool 22. Setpoints for the cable-specific image parameters are also stored in the memory unit 55 of the database 50. These setpoints may be setpoints for the stripping length of the cable end 12*b* and/or the width or thickness of the electrical conductor 14, and typically include tolerance values for the respective setpoints. In addition, these setpoints include symmetry values and/or ratio values, such as a ratio between the stripping length and the thickness of the electrical conductor 14 or the cable type that is currently undergoing the cable processing process. Additionally, further setpoints with regard to the divided material-specific regions are stored in the memory unit 55 of the database 50 and can be retrieved by the image processing system 30. These further setpoints may comprise setpoints for the surface area, area circumference and/or area diameter or the border structure of the respective material-specific regions, or comprise a combination of the values listed earlier, and include corresponding tolerance values.

The image processing system 30 is configured to capture at least the first cable-specific image parameter and/or at least the first analysed cable-specific image parameter from the respective detected image of the cable end 12*a*-12*d* of the cable 10 by means of an image measuring method. The first cable-specific image parameter and/or the second cable-specific image parameter are identified in terms of their colour and/or structure and/or the shape of the electrical conductor 14 and/or the cable isolation 13 and/or a cable shield (see FIG. 5) and/or of a sealing element 15.

The image measuring method comprises at least one image measuring algorithm, with which the detected and/or segmented image can be processed. In a first step, the image measuring algorithm is configured to measure the detected and/or segmented image geometrically in order to determine the first cable-specific image parameter and the second cable-specific image parameter, and in order to identify border structures. The border structures may be divided into contour points and then filtered mathematically by a direction vector so that only the measurement points of the cutting edge are obtained. In a further step, the median, the 10%-quantile and the 90%-quantile of the measurement points in the longitudinal axis of the cable 10 are evaluated statistically. An attribute of the cut quality in the cable processing process can be derived from the statistical dispersion of the measurement points at the cutting edge in the longitudinal axis of the cable 10.

The image processing system 30 compares the cable-specific image parameters and/or the material-specific regions from the detected and/or analysed images with the reference images or the respective setpoints from the database 50 and generates control-specific parameters which are forwarded to the control device 40. The control device 40 uses the control-specific parameters to control the drive 24 of the first tool 22.

FIGS. 2 to 4 show a first embodiment of the images described previously. This example visually illustrates the states of the cable end 12*a*-12*d* from the process work steps and method steps described herein. FIG. 2 shows a first image of the cable end 12*b* detected by the sensor device 25. The cable end 12*b* of the cable 10 has a coloured (blue) cable isolation 13 and an electrical conductor 14 consisting of multiple strand wires, which have a copper-coloured, twisted structure. FIG. 3 shows the cable end 12*b* which is segmented with the aid of the AI module 32, and in which at least one cable-specific image parameter is assigned to each pixel of the detected image. In this context, a background signal is assigned to a pixel of the detected image as a cable-specific parameter (e.g. black) if no cable end 12*b* or cable 10 is present for this pixel of the detected image. The cable isolation 13 is represented in a single colour, and the electrical conductor 14 with multiple strand wires, is shown with a hatching pattern. The AI module is taught accordingly and assigns a first material-specific region to the electrical conductor 14 and a second material-specific region to the cable isolation 13. The representations of the cable end 12*b* in both FIG. 2 and FIG. 3 show that a strand wire 14*a* deviates from the actual orientation of the electrical conductor 14. As described herein, the image processing system 30 measures this region 18 and compares the analysed cable-specific image parameters with the setpoints in the database 50. FIG. 4 shows the cable end 12*d* of the cable 10, segmented using the AI module 32, wherein the cable 10 has a terminal 16 in the form of a plug connector. The terminal 16 is attached and/or crimped at the two crimp regions 16*a,* on the electrical conductor 14 and on the cable isolation 13 using a tool 22 in the form of a crimping tool. The segmented image shows colours and hatch patterns assigned to the previously described regions and components which indicate their colour and/or structure and/or shape and are identified and measured by the image processing system 30, in order to be able to forward a new control-specific parameter or control dataset to the control device 40 if necessary. The setpoints described previously may comprise values for brushing of the strand wires on the conductor 14 or the length of the protruding strand wire 14*a* or a tolerance value for contaminating residues on the strand wire 14*a* and are also stored in the memory unit 55 of the database 50.

FIG. 5 shows a further embodiment of the previously described images of a cable end 12*d*', comparable to FIG. 4, wherein this cable 10' represents a coaxial cable as cable type, on which a further plug connector is mounted as terminal 16'. The terminal 16' is attached or crimped to the two crimp regions 16*a*' on the electrical conductor 14' and on the cable isolation 13' using a tool in the form of a crimping tool. The cable 10' further has a dielectric 15' and a cable shield 17'. The segmented image shows markings and/or hatch patterns assigned to the regions and components indicated previously, which refer to their colour and/or shape and are identified by the image processing system 30 and measured. As explained in the present document, the image processing system 30 measures the respective regions 18 in order to be able to created and optionally transfer a new control-specific parameter or control datasets to the control device 40.

FIGS. 6 and 7 show a further embodiment of the images of a cable end 12*d*" as described before, comparable to FIGS. 2 to 5, wherein the cable 10" represents a high-voltage cable as the cable type. The high-voltage cable or cable 10" has an electrical conductor 14", an inner cable isolation 13" and an outer cable isolation 13*a*", wherein a cable shield 17" and a foil 17*a*" are arranged between the cable isolations 13", 13*a*". The segmented image bears markings or hatch patterns assigned for the previously named regions and/or components, which refer to their colour and/or structure and/or shape and are identified by the image processing system 30 and are measured. As described in the present document, the image processing system 30 measures the respective regions 18" in order to generate a new control-specific parameter and/or control datasets and transmit them to the control device 40. In the case of high-voltage cables of such kind, for example, it is essential that the foil 17*a*" does not protrude out of the outer cable isolation 13*a*", and the control-specific parameter or the control dataset guarantees this for the stripping knife as the first tool and controls the stripping knife accordingly.

As shown in the further segmented image in FIG. 7, the high-voltage cable according to FIG. 6 is fitted with a ferrule 19" and the cable shield 17" folds over this ferrule 19". The folding back of the cable shield 17" may be effected for example by a rotating brush as the first tool. As described in the present document, the image processing system 30 measures the region 18" that defines the overlap area of the cable shield 17" folded over the ferrule 19", wherein the subsequently newly generated control-specific parameter or control dataset guarantees a sufficiently sized overlap area for the stripping knife and/or the rotary brush and controls the stripping knife and/or rotary brush. An adhesive tape may also be placed on the outer cable isolation 13*a*" instead of the ferrule 19", wherein the image processing system 30 detects whether the entire cable shield is underneath the adhesive tape (not shown).

FIGS. 8 to 10 shows a further embodiment of the previously described images of a cable end 12*d*'", comparable to FIG. 6 and FIG. 7, wherein the cable 10'" represents a high-voltage cable as the cable type.

FIG. 8 shows a front face view of the high-voltage cable or cable 10'" in the unprocessed state, wherein the cable 10'" has a first electrical conductor 14'" and a second electrical conductor 14*a*, each of which comprises an inner cable isolation 13'", 13*a*'" and an outer cable isolation 13*c*'", wherein an isolation filler 13*b*'" is arranged between the inner cable isolations 13'", 13*c*'" and the outer cable isolation 13*c*'". The isolation filler 13*b*'" is sheathed in a cable shield 17'". FIG. 9 and FIG. 10 show a side view (FIG. 9) and a front view (FIG. 10) of the cable 10'" after the stripping process work step, wherein besides the elements illustrated in FIG. 8 a ferrule 19'" is shown seated on the outer cable isolation 13*c*'" and wherein the cable shield 17'" is folded over a ferrule 19'". The cable shield 17'" is fixed an the outer cable isolation 13*c*'" with an adhesive tape 17*b*'".

The segmented images in FIGS. 8 to 10 show markings or hatch patterns assigned for the previously named regions and components which indicate their colour and/or structure and/or shape and are identified by the image processing system 30 and are measured. As described in the present document, the image processing system 30 measures the respective regions 18'", 18*a* in order to generate a new control-specific parameter and/or control datasets and transmit them to the control device 40. In the case of high-voltage cables of such kind, for example, it is essential that the two electrical conductors are not twisted. The image processing system 30 checks this using a detected image from the imaging sensor device 25, which detects the front view of the unprocessed high-voltage cable 10'" (FIG. 8) and identifies the positions of the two electrical conductors 14'" and 14*a*. This serves as the basis for the subsequent process work step of stripping, because here the situation or position of the two electrical conductors 14'" and 14*a*'" (twisted relative to the horizontal for example) can be corrected. The image processing system 30 also measures the respective regions 18'", 18*a*'" around the electrical conductor 14'", 14*a*'", which serve as the basis for control-specific parameter and/or control dataset for the subsequent process work step of stripping for the stripping knife or the cable feed device as the second tool, in order to control said tools correspondingly. FIG. 9 shows the high-voltage cable after stripping, with electrical conductors 14'" and 14*a*'" spaced apart from each other, and FIG. 10 shows the front view of the high-voltage cable after stripping with electrical conductors 14'" and 14*a*'" twisted and spaced apart from each other. The measured regions 18'", 18*a*'" are accordingly of different sizes, so that the image processing system 30 can compare these regions 18'" with stored datasets in order to define a reject if necessary. Otherwise, the control-specific parameter and control dataset serve to control the cable feed device and/or a crimping tool as the further tool in the subsequent process work step.

The front views shown are detectable in particular with the imaging sensor device 25 of the cables according to FIGS. 2 to 7, wherein the cable-specific parameters and/or material-specific regions that can be produced therefrom are used by the image processing system 30 to generate control-specific parameters, which are used for example to improve the positioning of the sealing elements or ferrules on the cable end. Additionally, in a further embodiment the imaging sensor device 25 is configured to detect the position of at least one of the tools described in the present document, e.g., the position of a crimping tool, in order to position the cable precisely in a cable connector housing (not shown).

FIG. 11 shows a first method for automatic determination and generation of control datasets and/or control-specific parameters for controlling at least one cable processing station 20, which is stored in computer-implemented manner in the control device 40 of the cable processing station 20. Thereafter, reference is made to FIG. 1. With the methods disclosed hereafter, control datasets and/or control-specific parameters can be determined and generated for processing the cables according to FIGS. 1 to 10.

In a first step, an endless cable or a cable 10 which has already been cut to a defined cable length is transported to the cable processing station 20 (step 100).

Then, order data from the database 50 for processing the cable 10, comprising control datasets and/or control-specific parameter for controlling the first tool 22 are loaded into the control device 40 (step 101). The order data for the cables 10 that are to be processed further comprise corresponding control tolerances and cable-specific image parameters and/or material-specific regions together with tolerance values.

In the next step, the cable end 12*a* is processed, wherein in the present case the cable isolation 13 is stripped (step 102).

Then, an image 26 of the at least one cable end 12*b* of the cable 10 is detected with the first imaging sensor device 25 (step 103).

In the next step, the detected image 26 is transmitted to the image processing system 30 and a first cable-specific image parameter and at least one second cable-specific image parameter is identified, and the first cable-specific image parameter and the second cable-specific image parameter are analysed by the AI module 32, and a semantic segmentation of the detected image 26 is carried out (step 104).

Then, the detected image 26 of the cable end 12*b* is divided into at least two material-specific regions, comprising the cable isolation 13 and the electrical conductor 14 on the basis of the first cable-specific image parameter and the second cable-specific image parameter, and the material-specific regions are measured geometrically by the image measuring algorithm in arithmetic unit in the image processing system 30 (step 105).

In the next step, at least one of the measured cable-specific image parameters is compared with a setpoint for this cable-specific image parameter, wherein the setpoint originates from the order data (step 106). A deviation value is determined.

Following the comparison of the measured cable-specific image parameter with the corresponding setpoint, it is ascertained whether the deviation value lies within the control tolerance of the control-specific parameter (step 107).

If the measured cable-specific image parameter is outside the respective control tolerance, the cable processing process is terminated and an error message is sent to the control device 40 and the operator of the cable processing station (step 109). The error message includes for example the prompt to replace the first tool 22 and it is displayed visually in a display of the cable processing station 20. The faulty cable is ejected.

If the measured cable-specific image parameter lies within the respective control tolerance of the control-specific parameter of the first tool, an average is calculated in the image processing system 30 (step 108).

At least one new control dataset and/or at least one new control-specific parameter is generated on the basis of the calculated average, saved in the memory unit 55 and transmitted to the control device 40 for controlling or regulating the tool 22 (step 110).

In a next step 111, the measured cable-specific image parameter is compared with the corresponding setpoint or the tolerance value of the corresponding setpoint, and in the event of a deviation of the comparison parameters, the cable 10 currently in the cable processing process is disposed of (step 112) or said cable processing process is terminated (step 113).

FIGS. 12 and 13 show a cable processing machine 120 with a number of cable processing stations 60, 70, 80. A cable feed device 90 is arranged at the cable processing machine 120 for transporting the cable 10 to the cable processing stations 60, 70, 80. Here, the processing of the cable 10 takes place, as shown and described in FIG. 1, wherein instead of one cable processing station 20 with multiple tools 22, multiple cable processing stations 60, 70, 80 are present, each having one separate tool. The cable processing machine 120 shown in FIG. 10 includes a cable processing station 60 stripping the cable isolation 13 from the cable 10, a cable processing station 70 for fitting a sealing element 15 on the cable 10, and a cable processing station 80 for crimping a terminal 16 on cable 10. The cable processing stations 60, 70, 80 each have one tool, namely a stripping knife 61, a fitting device 71, and a crimping tool 81, each of which includes a drive and is electrically connected to a central controller 140 for the purpose of exchanging control-specific parameters and/or control datasets.

As was explained with reference to FIG. 1, an image processing system 30 is provided which is connected to a central controller 140 of the cable processing machine 120 for the purpose of exchanging control-specific parameters and/or control datasets. The image processing system 30 is configured to generate at least one control-specific parameter and/or one control dataset on the basis of the first cable-specific image parameter and the second cable-specific image parameter and transmit same to the central controller 140 for controlling the tools of cable processing stations 60, 70, 80. The first imaging sensor device 25 is designed to detect at least one separate image 62, 72, 82 of the cable end of the cable 10 before each process work step in the individual cable processing stations 60, 70, 80.

FIG. 14 shows a further method for automatically determining and generating control datasets and/or control-specific parameters for controlling the cable processing machine 120 with multiple cable processing stations 60, 70, 80, which are/is stored in computer-implemented manner in the central controller 140 of the cable processing machine 120. The method which will be described below comprises methods that were at least partly disclosed in FIG. 11. In the following text, reference is made to FIG. 1, FIG. 12 and FIG. 13. With the methods disclosed in the following text, it is possible to determine and generate control datasets and/or control-specific parameters for processing cables as described in FIGS. 1 to 10.

In a first step, an endless cable or a cable 10 that has already been cut to a defined cable length is transported by the cable feed device 90 to the cable processing station 60 (step 200).

Then, order data comprising control datasets and/or control-specific parameters for controlling the stripping knife 61 are loaded from the memory unit 55 of the database 50 into the central controller 140 for processing the cable 10 (step 201). The order data for the cables 10 to be processed further comprise corresponding control tolerances and cable-specific image parameters and/or material-specific regions together with t tolerance values.

In the next step, the cable end 12*a* is processed, which in the present case consists of stripping the cable isolation 13 (step 202).

Then, a first image 62 of the at least one cable end 12*b* of the cable is detected with the first imaging sensor device 25 (step 203).

In the next step, the detected image 62 is transmitted to the image processing system 30, and a first cable-specific image parameter and at least one second cable-specific image parameter are identified, and the first cable-specific image parameter and the second cable-specific image parameter are analysed by the AI module 32, and a semantic segmentation of the detected image 62 is carried out (step 204).

Then, the detected image 62 of the cable end 12*b* is divided into at least two material-specific regions, which are assigned to the cable isolation 13 and the electrical conductor 14, on the basis of the first cable-specific image parameter and the second cable-specific image parameter, and the material-specific regions are measured geometrically with regard to their area size and/or region length and/or their border structure by the image measuring algorithm in the arithmetic unit of the image processing system 30 (step 205).

In the next step, at least one of the cable-specific image parameters is compared with a setpoint for this cable-specific image parameter or at least one material-specific region is compared with a setpoint for this material-specific region, wherein the respective setpoint originates from the order data (step 206). A deviation value is also determined. Following the comparison of the respective cable-specific image parameter or material-specific region with the corresponding setpoint, a determination is made as to whether the deviation value lies within the control tolerance of the control-specific parameter (step 207).

If the measured cable-specific image parameter or the material-specific region falls outside the respective control tolerance, the cable processing process is terminated and an error message is transmitted to the central controller 140 and/or the operator of the cable processing station (step 209). The error message includes for example a prompt to replace the tool and is displayed visually in a display of the cable processing station. The faulty cable is ejected.

If the measured cable-specific image parameter or material-specific region falls within the respective control tolerance of the control-specific parameter for the stripping knife 61, an average is calculated in the image processing system 30 (step 208).

In a next step 211, the material-specific region is compared with the corresponding tolerance value in the image processing system 30, and if there is a deviation between the deviation values, the cable 10 undergoing the cable processing process is disposed of (step 212).

In a further step, the previously processed cable 10 is transported by the cable feed device 90 along the direction of motion 23 to the cable processing station 70, and the order data for processing the cable 10, comprising control datasets and/or control-specific parameters for controlling the fitting device 71 for fitting the sealing element 15 and/or the cable feed device 90, is loaded from the memory unit 55 of the database 50 into the central controller 140. In a next step, processing of the cable end 12*c* takes place, wherein the sealing element 15 is arranged on the cable end 12*c* (step 300). The order data for the cables 10 to be processed further comprise corresponding control tolerances and cable-specific image parameters and/or material-specific regions together with tolerance values.

Then, a second image 72 of the at least one cable end 12*c* of the cable is detected with der first imaging sensor device 25 (step 302).

In a next step, the second detected image 72 is transmitted to the image processing system 30 and a first cable-specific image parameter, a second cable-specific image parameter, and a further/third cable-specific image parameter are identified, and the first cable-specific image parameter, the second cable-specific image parameter and the third cable-specific image parameter are analysed by the AI module 32 and a semantic segmentation of the detected image 72 is carried out (step 303).

Then, the second detected image 72 of the cable end 12*c* is divided into at least three material-specific regions, which are assigned to the cable isolation 13, the electrical conductor 14 and the sealing element 15, on the basis of the first cable-specific image parameter, the second cable-specific image parameter and the third cable-specific image parameter, and the material-specific regions are measured geometrically with regard to their area size and/or region length and/or their border structure by the image measuring algorithm in the arithmetic unit of the image processing system 30 (step 304).

In a next step, at least one of the cable-specific image parameters is compared with a setpoint for this cable-specific image parameter, or at least one material-specific region is compared with a setpoint for this material-specific region, wherein the respective setpoint originates from the order data (step 305). A deviation value is determined. Following the comparison of the respective cable-specific image parameter or material-specific region with the corresponding setpoint, a determination is made as to whether the deviation value lies within the control tolerance of the control-specific parameter (step 307).

If the measured cable-specific image parameter or the material-specific region is outside the respective control tolerance, the cable processing process is terminated and/or an error message is sent to the central controller 140 and/or the operator of the cable processing station (step 309). The error message includes for example the prompt to clean the tool, and it is displayed visually in a display of the cable processing station. The faulty cable is ejected.

If the measured cable-specific image parameter or the material-specific region lies within the respective control tolerance of the control-specific parameter of the fitting device 71 and/or the cable feed device 90, an average is calculated in the image processing system 30 (step 308).

At least one new control dataset and/or at least one new control-specific parameter is generated on the basis of the calculated average, saved in the memory unit 55 and transmitted to the central controller 140 for controlling or regulating the fitting device 71 and/or the cable feed device 90 (step 310).

In a next step 311, the material-specific region is compared with the corresponding tolerance value in the image processing system 30, and in the event of a deviation of the deviation values, the cable 10 currently in the cable processing process is disposed of (step 212)

In a further step, the previously processed cable 10 is transported by the cable feed device 90 along the direction of motion 23 to the cable processing station 80, and the order data for processing the cable 10, comprising control datasets and/or control-specific parameters for controlling a crimping tool 81 for crimping a terminal 16 onto the cable end of the cable 10, and/or the cable feed device 90, is loaded from the memory unit 55 of the database 50 into the central controller 140. In a next step, processing of the cable end 12*c* takes place, wherein the terminal 16 is arranged on the cable end 12*c* (step 400).

Then, a third image 82 of the at least one cable end 12*d* of the cable 10 is detected with der first imaging sensor device 25 (step 402).

In a next step, the third detected image 82 is transmitted to the image processing system 30 and a first cable-specific image parameter, a second cable-specific image parameter, a third cable-specific image parameter, and a further cable-specific image parameter are identified, and the first cable-specific image parameter, the second cable-specific image parameter, the third cable-specific image parameter and the further cable-specific image parameter are analysed by the AI module 32 and a semantic segmentation of the third detected image 82 is carried out (step 403).

Then the third detected image 82 of the cable end 12*d* is divided into at least four material-specific regions, which are assigned to the cable isolation 13, the electrical conductor 14 and the sealing element 15, and the terminal 16 on the basis of the first cable-specific image parameter, the second cable-specific image parameter and the third cable-specific image parameter and the further cable-specific image parameter, and the material-specific regions are measured geometrically with regard to their area size and/or region length and/or their border structure by the image measuring algorithm in the arithmetic unit of the image processing system 30 (step 404).

In a next step, at least one of the cable-specific image parameters is compared with a setpoint for this cable-specific image parameter, or at least one material-specific region is compared with a setpoint for this material-specific region, wherein the respective setpoint originates from the order data (step 405). A deviation value is determined Following the comparison of the respective cable-specific image parameter or material-specific region with the corresponding setpoint, a determination is made as to whether the deviation value lies within the control tolerance of the control-specific parameter (step 407).

If the measured cable-specific image parameter or the material-specific region is outside the respective control tolerance, the cable processing process is terminated and an error message is sent to the central controller 140 and/or the operator of the cable processing station (step 409). The error message includes for example the prompt to replace the tool or inspect the tool for defects, and it is displayed visually in a display of the cable processing station. The faulty cable is ejected.

If the measured cable-specific image parameter or the material-specific region lies within the respective control tolerance of the control-specific parameter of the crimping tool 81 and/or the cable feed device 90, an average is calculated in the image processing system 30 (step 408). At least one new control dataset and/or at least one new control-specific parameter is generated on the basis of the calculated average, saved in the memory unit 55 and transmitted to the central controller 140 for controlling or regulating the crimping tool 81 and/or the cable feed device 90 (step 410).

The material-specific region is then compared with the corresponding tolerance value in the image processing system 30, and in the event of a deviation of the deviation values, the cable 10 currently in the cable processing process is disposed of (step 212)

Then the fully processed cable 10 is stored in a cable tray (step 411).

LIST OF REFERENCE NUMERALS

10 Cable
10' Cable
10" Cable (high-voltage cable)
10'" Cable (high-voltage cable)
12*a*-12*d* Cable end of 10
12*d*' Cable end of 10°
12*d*" Cable end of 10"
12*d*'" Cable end of 10'"
13 Cable isolation of 10 (jacket)
13' Cable isolation of 10° (jacket)
13" Inner isolation
13*a*" Outer isolation
13'" Inner isolation
13*a*'" Inner isolation
13*b*'" Filler
13*c*'" Outer isolation
14 Electrical conductors of 10 (strand)
14' Electrical conductors of 10' (strand)
14" Electrical conductors of 10" (strand)
14'" First electrical conductor of 10'" (strand)
14*a*'" Second electrical conductor of 10'" (strand)
15 Sealing element of 10 (dielectric)
15' Dielectric of 10'
16 Terminal of 10
16' Terminal of 10' (crimp region)
16*a*' Crimp regions of 10'
17' Cable shield of 10'
17" Cable shield of 10"
17*a*" Foil of 10"
17'" Cable shield of 10'"
17*a*'" Tape
18 Regions
18" Region
18'" Regions
18*a*'" Regions
19" Ferrule
19'" Ferrule
20 Cable processing station
22 First tool
23 Direction of motion of 22
24 Drive of 22
25 Imaging sensor device
26 Image
27 Filter elements of 25
30 Image processing system
32 AI module
33 Arithmetic unit
34 Neural network
40 Control device
50 Database
55 Memory unit
60 Cable processing station
61 Stripping knife
62 First image
70 Cable processing station
71 Fitting device
72 Second image
80 Cable processing station
81 Crimping tool
82 Third image
90 Cable feed device
120 Cable processing machine
140 Central controller
100-113 Process work steps
200-411 Process work steps

The invention claimed is:

1. A cable processing station (20; 60; 70; 80) for processing a cable end (12*a*-12*d*; 12*d*') in the production of a cable (10; 10'), the cable being one of an electrical or an optical cable, the processing station comprising: a first machine tool (22; 61; 71; 81; 90) for processing the cable (10; 10'), an electronic control device (40) for controlling operation of the first machine tool (22; 61; 71; 81; 90) and a first electronic imaging sensor device (25) for detecting at least one image (62; 72; 82) of the cable end (12*a*-12*d*; 12*d*') of the cable (10; 10'), and a computerized image processing system (30), wherein the image processing system (30) is connected to the electronic control device (40) for exchanging control-specific parameters for controlling operation of the first machine tool (22; 61; 71; 81; 90), wherein the image processing system (30) is configured to identify a first cable-specific image parameter relating to the cable end (12*a*-12*d*; 12*d*') of the cable (10; 10') and a second cable-specific image parameter relating to the cable end (12*a*-12*d*; 12*d*') of the cable (10; 10') from the detected image (62; 72; 82), and to create a control-specific parameter on the basis of the first cable-specific image parameter and the second cable-specific image parameter and to transmit the control-specific parameter to the electronic control device (40) for controlling operation of the first machine tool (22; 61; 71;

81; 90), where the first and the second cable-specific image parameters are respectively identified as a material property of the cable, a structural property of the cable, a color property of the cable, a shape property of the cable, an insulation of the cable, a shielding of the cable, a sealing element of the cable, a connecting element of the cable or a type of the cable.

2. The cable processing station according to claim 1, wherein the image processing system comprises an AI (artificial intelligence) module (32) connected to the first electronic imaging sensor device (25), and configured to capture the first cable-specific image parameter and the second cable-specific image parameter from the detected image (62; 72; 82).

3. The cable processing station according to claim 2, wherein the AI module (32) comprises a neural network (34) of a computer that is designed to analyse the detected image (62; 72; 82) and preferably perform a semantic segmentation of the detected image (62; 72; 82), in order to assign a cable-specific image parameter to each pixel of the detected image (62; 72; 82), and to transmit a first analysed cable-specific image parameter and a second analysed cable-specific image parameter to the image processing system (30).

4. The cable processing station according to claim 1, wherein the image processing system (30) is configured to carry out a segmentation of the detected image (62; 72; 82).

5. The cable processing station according to claim 1, wherein the image processing system (30) is configured to divide the detected image (62; 72; 82) of the cable end (12*a*-12*d*; 12*d*') of the cable (10; 10') into a first material-specific region and a second material-specific region on the basis of the first cable-specific image parameter and the second cable-specific image parameter, or to divide the detected image (62; 72; 82) of the cable end (12*a*-12*d*; 12*d*') of the cable (10; 10') into a first material-specific region and a second material-specific region on the basis of the first analysed cable-specific image parameter and the second analysed cable-specific image parameter.

6. The cable processing station according to claim 5, wherein the first material-specific region comprises an electrical conductor (14; 14') of the cable (10; 10'), and the second material-specific region comprises at least a cable isolation (13; 13'), wherein, based on a comparison of the first cable-specific image parameter and the second cable-specific image parameter, (40) the control-specific parameter transmitted to the electronic control device controls the first machine tool such that the first machine tool moves relative to the cable end (12*a*-12*d*; 12*d*') and processes the cable end (12*a*-12*d*; 12*d*').

7. The cable processing station according to claim 1, wherein a database (50) is present, and is connected to the image processing system (30), wherein the database (50) has an electronic memory unit (55) for storing reference images and/or reference contours for various cable ends (12*a*-12*d*; 12*d*').

8. The cable processing station according to claim 7, wherein a setpoint is stored in the at least one electronic memory unit (55) for at least one cable-specific image parameter and/or for at least one material-specific region on the cable end (12*a*-12*d*; 12*d*'), wherein the at least one cable-specific image parameter and/or the at least one material-specific region is compared to the setpoint and the first machine tool is controlled to process the cable end (12*a*-12*d*; 12*d*') of the cable (10; 10') based on a result of the comparison.

9. The cable processing station according to claim 1, wherein the image processing system (30) is configured to capture the first cable-specific image parameter and/or the first analysed cable-specific image parameter from the detected image (62; 72; 82) of the cable end (12*a*-12*d*; 12*d*') of the cable (10; 10') using an image measurement method.

10. The cable processing station according to claim 1, wherein the first cable-specific image parameter and the second cable-specific image parameter are each one of a color, a structure, and a shape of at least one of the electrical conductor (14; 14'), the cable isolation (13; 13'), a cable shield (17') and a sealing element (15).

11. The cable processing station according to claim 2, wherein one or more of the AI module (32) and the image processing system (30) is configured to capture a further cable-specific image parameter from the detected image (62; 72; 82), which further cable-specific parameter is assigned to a terminal (15) for the cable end (12*a*-12*d*; 12*d*') of the cable (10;10').

12. The cable processing station according to claim 1, wherein the electronic control device (40) is designed to pause and/or stop a process work step of the first machine tool (22; 61; 71; 81; 90) on the basis of the control-specific parameter.

13. A computer-implemented method for automatically determining and generating control datasets and/or control-specific parameters for controlling a cable processing station (20; 60; 70; 80) which processes a cable end of a cable, the method comprising:

- detecting an image (62; 72; 82) of the cable end (12*a*-12*d*; 12*d*') of the cable (10; 10') with a first electronic imaging sensor device (25);
- receiving the detected image (62; 72; 82) at an image processing system (30);
- identifying a first cable-specific image parameter and at least a second cable-specific image parameter, where the first and the second cable-specific image parameters are respectively identified as a material property of the cable, a structural property of the cable, a color property of the cable, a shape property of the cable, an insulation of the cable, a shielding of the cable, a sealing element of the cable, a connecting element of the cable or a type of the cable;
- generating a control dataset and/or a control-specific parameter based on the first cable-specific image parameter and the second cable-specific image parameter.

14. The computer-implemented method according to claim 13, wherein the method further comprises transmitting the control-specific parameter to a electronic control device (40), and transmitting the control dataset to an electronic memory unit (55).

15. The computer-implemented method according to claim 13, wherein the method further comprises capturing the first cable-specific image parameter and the second cable-specific image parameter from the detected image (62; 72; 82) using an AI module (32), wherein the AI module (32) and/or the image processing system (30) analyses the at least one detected image (62; 72; 82).

16. The computer-implemented method according to claim 15, wherein the method further comprises carrying-out a semantic segmentation of the detected image (62; 72; 82) by the AI module (32) and/or the image processing system (30) and assigning at least one cable-specific image parameter to each pixel of the detected image.

17. The computer-implemented method according to claim 15, wherein the method further comprises teaching the AI module (32) using the at least one cable-specific image parameter.

18. The computer-implemented method according to claim 13, wherein the method further comprises; dividing the detected image (62; 72; 82) of the cable end (12a-12d; 12d') of the cable (10; 10') is divided into a first material-specific region and a second material-specific region on the basis of the first cable-specific image parameter and the second cable-specific image parameter, preferably divided into at least two material-specific regions on the basis of the first analysed cable-specific image parameters and the second analysed cable-specific image parameter.

19. The computer-implemented method according to claim 13, wherein the method further comprises: comparing the cable-specific image parameter with a setpoint for the cable-specific image parameter, and generating the control-specific parameter and/or the control dataset based on the comparison; and controlling a first machine tool of the cable processing station to process the cable end of the cable based on the control dataset and/or the control-specific parameter.

20. A cable processing machine (120) with at least two cable processing stations (20; 60; 70; 80), wherein at least one cable processing station (20) is embodied according to the cable processing station of claim 1 and implements a method for automatically determining and generating control datasets and/or control-specific parameters for controlling the cable processing station (20) which processes a cable end of a cable, wherein an image (62; 72; 82) of the cable end (12a-12d; 12d') of the cable (10; 10') is detected with a first electronic imaging sensor device (25), and a control dataset and/or a control-specific parameter is automatically generated and saved, and an image processing system (30) is provided, which receives the detected image (62; 72; 82) and identifies a first cable-specific image parameter and a second cable-specific image parameter and generates the control dataset and/or the control-specific parameter on the basis of the first cable-specific image parameter and the second cable-specific image parameter;

wherein the image processing system (30) is connected to a central controller (140) for exchanging control-specific parameters and/or control datasets, and the image processing system (30) is configured to generate a control-specific parameter and/or a control dataset on the basis of the first cable-specific image parameter and the second cable-specific image parameter, and transmit the control-specific parameters and/or control datasets to the central controller (140) for controlling at least one of the tools (22; 61; 71; 81; 90) of at least one of the two cable processing stations (20; 60; 70; 80).

* * * * *